(12) United States Patent
Sato et al.

(10) Patent No.: US 6,201,488 B1
(45) Date of Patent: Mar. 13, 2001

(54) CODEC FOR CONSECUTIVELY PERFORMING A PLURALITY OF ALGORITHMS

(75) Inventors: Teruyuki Sato; Hideaki Kurihara, both of Kawasaki; Yoshinori Soejima, Fukuoka; Yasuko Shirai; Masato Ito, both of Kawasaki; Kazuhiro Nomoto, Fukuoka, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/257,788

(22) Filed: Feb. 25, 1999

(30) Foreign Application Priority Data

Apr. 24, 1998 (JP) .................................................. 10-115505

(51) Int. Cl.[7] .................................................... H03M 7/00
(52) U.S. Cl. .......................... 341/106; 341/155; 712/228; 712/246; 709/107
(58) Field of Search .................................... 341/106, 155, 341/126, 141, 110, 117, 61, 67; 370/474, 476; 358/261.1; 375/340; 709/246, 247, 250, 107; 712/246, 228

(56) References Cited

U.S. PATENT DOCUMENTS 5,630,130 * 5/1997 Perotto et al. ........................ 709/107

FOREIGN PATENT DOCUMENTS 2-163862 6/1990 (JP) .
4-068459 3/1992 (JP) .

* cited by examiner

Primary Examiner—Michael Tokar
Assistant Examiner—Jean B. Jeanglaude
(74) Attorney, Agent, or Firm—Helfgott & Karas, PC.

(57) ABSTRACT

A CODEC has a DSP which can consecutively execute a plurality of algorithms without restriction of a memory capacity. The DSP performs an encoding/decoding operation on a digital signal. A program memory stores a program divided into a plurality of block programs, the program being stored on an individual block program basis. A data memory stores a set of data used for executing each block program stored in the program memory, the set of data being divided into a plurality of data blocks and stored on an individual data block basis. A program executing unit executes each block program stored in the program memory by using a corresponding data block stored in the data memory. A program changing unit obtains a new block program from an external device each time execution of one of the block programs by the program executing unit is completed so as to store the obtained new block program in the program memory.

11 Claims, 25 Drawing Sheets

CODEC FOR CONSECUTIVELY PERFORMING A PLURALITY OF ALGORITHMS

BACKGROUND OF THE INVENTION

1. Field of the Invention

The present invention relates to a CODEC and, more particularly, to a CODEC having a DSP which can perform a plurality of algorithm processes.

2. Description of the Related Art

In recent years, with the development of communication networks, a CODEC (coder and decoder) having a larger capacity has been required.

Conventionally, a CODEC has a DSP (digital signal processor) therein so as to encode and decode a digital signal by the DSP.

FIG. 1 is a block diagram of a conventional mask-type DSP. The DSP 200 shown in FIG. 1 comprises a ROM 201, a RAM 202, an IO port 203 and a DSP core 204. The ROM 201 stores programs for operations of the DSP 200. The RAM 202 stores working data. Data is input from or output to an external device via the IO port 203. The DSP core 204 executes programs loaded from the ROM 201 by using the work data received from the RAM 202. The DSP core 204 has a program counter (PC) 205 which serves as an access pointer of the ROM 201.

When the DSP 200 is in operation, programs stored in the ROM 201 are sequentially read by the DSP core 204 in an order starting from an address designated by the PC 205, and the read programs are executed by the DSP core 204. A result of execution of the programs is output from the IO port 203. Additionally, when the DSP 200 is in operation, the work data stored in the RAM 202 is read by the DSP core 204, if necessary, and the read work data is processed by the DSP core 204. The processed work data is stored in the RAM 202.

As mentioned above, since the programs and the work data are separately stored in different memories, the DSP can perform a high-speed processing.

FIG. 2 is a block diagram of the DSP 200 shown in FIG. 1 in a state in which a signal having two channels is processed. As shown in FIG. 2, the RAM 202 has tow independent memory areas so as to process the signal having two channels. One of the two memory areas stores work data for a channel (1) and the other stores work data for a channel (2). By structuring the RAM 202 as mentioned above, programs in the ROM 201 are executed twice within a unit time so as to achieve a processing of the signal having the two channels.

The above description is for a case in which an algorithm (programs) of each channel is the same. Conventionally, when a plurality of algorithms are required, a plurality of CODECs each of which processes according to only one specific algorithm are provided. Accordingly, in the conventional system, algorithms to be executed cannot be changed in response to a dynamic change in network traffic.

In order to change algorithms in response to a dynamic change in network traffic, a plurality of algorithms must be stored in a single CODEC. However, a memory provided in a DSP of a conventional CODEC does not have a capacity sufficient for storing programs for executing a plurality of algorithms. Accordingly, when the conventional DSP executes an algorithm different from an algorithm being executed, there is a problem in that an execution of a current program must be temporarily stopped so as to load other programs to the memory in the DSP.

SUMMARY OF THE INVENTION

It is a general object of the present invention to provide an improved and useful CODEC in which the above-mentioned problem is eliminated.

A more specific object of the present invention is to provide a CODEC having a DSP which can consecutively execute a plurality of algorithms without restriction of a memory capacity.

In order to achieve the above-mentioned objects, there is provided according to the present invention a CODEC comprising a data processing unit performing an encoding/decoding operation on a digital signal, the data processing unit comprising:

a program memory storing a program divided into a plurality of block programs, the program being stored on an individual block program basis;

a data memory storing a set of data used for executing each block program stored in the program memory, the set of data being divided into a plurality of data blocks and stored on an individual data block basis;

a program executing unit executing each block program stored in the program memory by using a corresponding data block stored in the data memory; and a program changing unit obtaining a new block program from an external device each time execution of one of the block programs by the program executing unit is completed so as to store the obtained new block program in the program memory.

According to the present invention, the program changing unit loads the new block program provided from the external device to program memory at a timing of completion of execution of one of the block programs. Thus, each of the block programs in the program memory is executed in each phase, and a program can be provided from an external device and is stored in the program memory on an individual block basis. Accordingly, a plurality of programs (algorithms) can be consecutively performed when the CODEC is operated over a plurality of phases.

The phase means a time period during which the CODEC executes a single program, and is equalized. For example, a plurality of algorithms can be performed by executing a program A in phase 1, program B in phase 2 and program C in phase 3.

Additionally, a program having a large amount which exceeds a capacity of the program memory can be executed by dividing the program into a plurality of block programs and executing each of the block programs by sequentially loading each of the block programs to the program memory.

In one embodiment according to the present invention, the program memory may include a plurality of banks each of which stores one of the block programs so that the program is executed by the program executing unit sequentially executing the block program in each of the banks selected in a predetermined order.

Additionally, the data memory may include a plurality of banks each of which stores one of the data blocks so that the data block stored in one of the banks is used when each of the program block is executed by the program executing unit, the one of the banks being sequentially selected in a predetermined order.

According to the present invention, the program changing unit may store the new data in one of the banks of the program memory, the one of the banks having stored one of the block programs of which execution is completed. Accordingly, the block programs stored in each bank is replaced with a new program block after a block program stored in the one of the banks is completed. Thus, a plurality of algorithms can be performed by executing the block program in one of the banks sequentially selected in a predetermined order.

Additionally, the data processing unit may further comprise a block program obtaining unit obtaining the new block program from a first external memory each time an execution of the block program by the program executing unit is completed so as to provide the obtained block program to the program changing unit.

Additionally, the block program obtaining unit may store first load table information representing a relationship between phases of a program processing and the block program obtained from the first external memory. Thereby, the block program obtaining unit obtaining the new block program from the first external memory based on the first load table information.

Further, the data processing unit may further comprise a data changing unit obtaining a new data block from an external device each time execution of one of the block programs by the program executing unit is completed so as to store the obtained new data block in the data memory.

Additionally, the data processing unit may further comprise a data block obtaining unit obtaining the new data block program from a second external memory each time an execution of the block program by the program executing unit is completed so as to provide the obtained new data block to the data changing unit.

Additionally, the data block obtaining unit may store store table information and second load table information, the store table information representing a relationship between phases of a program processing and data to be returned from the data memory to the second external memory, the second load table information representing a relationship between the phases of a program processing and data to be obtained from the second external memory. Thereby, the data block obtaining unit returns the data block that have been used from the data memory to the second external memory, and the data block obtaining unit obtains the new data block from the second external memory based on the second load table information.

Additionally, the first load table information, the second load table information and the store table information may be rewritable so that an order of programs to be executed is changed or the same program is executed by referring to different sets of data by rewriting the table information, if necessary.

Other objects, features and advantages of the present invention will become more apparent from the following detailed description when read conjunction with the accompanying drawings

DETAILED DESCRIPTION OF THE PREFERRED EMBODIMENTS

Figure 1:
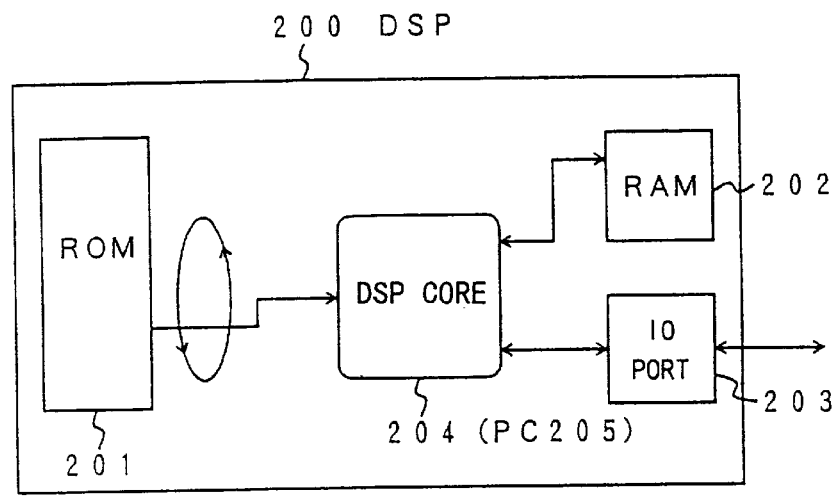
FIG. 1 is a block diagram of a conventional mask-type DSP.
Figure 2:
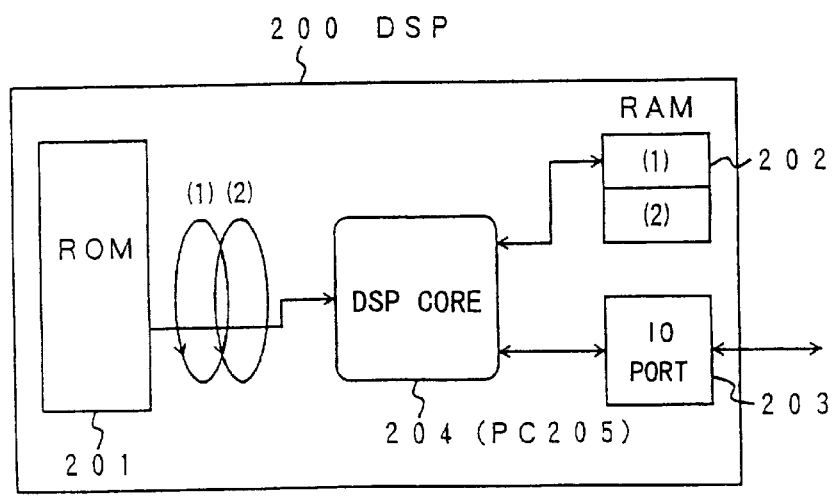
FIG. 2 is a block diagram of the DSP shown in FIG. 1 in a state in which a signal having two channels is processed.
Figure 3:
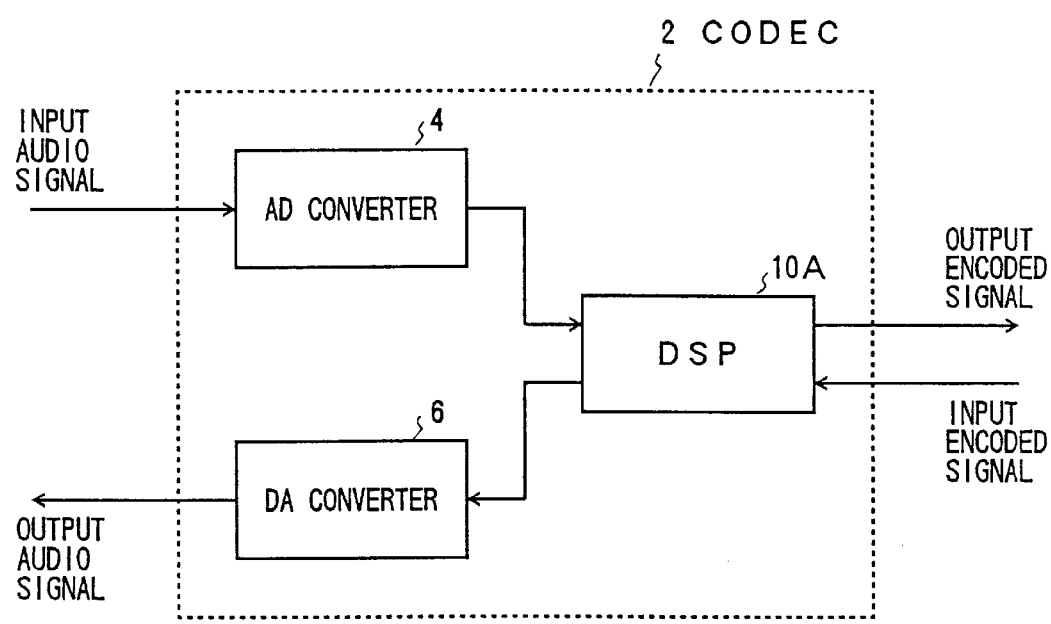
FIG. 3 is a block diagram of a CODEC according to a first embodiment of the present invention.

A description will now be given of a first embodiment of the present invention. FIG. 3 is a block diagram of a CODEC 2 according to the first embodiment of the present invention.

As shown in FIG. 3, the CODEC 2 according to the first embodiment of the present invention comprises an AD converter 4, a DA converter 6 and a DSP 10A. The AD converter converts an analog signal into a digital signal. The DA converter 6 converts a digital signal to an analog signal. The DSP 10A encodes or decodes signals input thereto.

An analog signal such as an audio signal input to the CODEC 2 is converted into a digital signal by the AD converter 4 and supplied to the DSP 10A. The DSP 10A encodes the digital signal and the encoded digital signal is output from the CODEC 2. On the other hand, an encoded signal input to the CODEC 2 is decoded by the DSP 10A and the decoded signal is supplied to the DA converter 6. The decoded signal is converted into an analog signal such as an audio signal, and is output from the CODEC 2.

Figure 4:
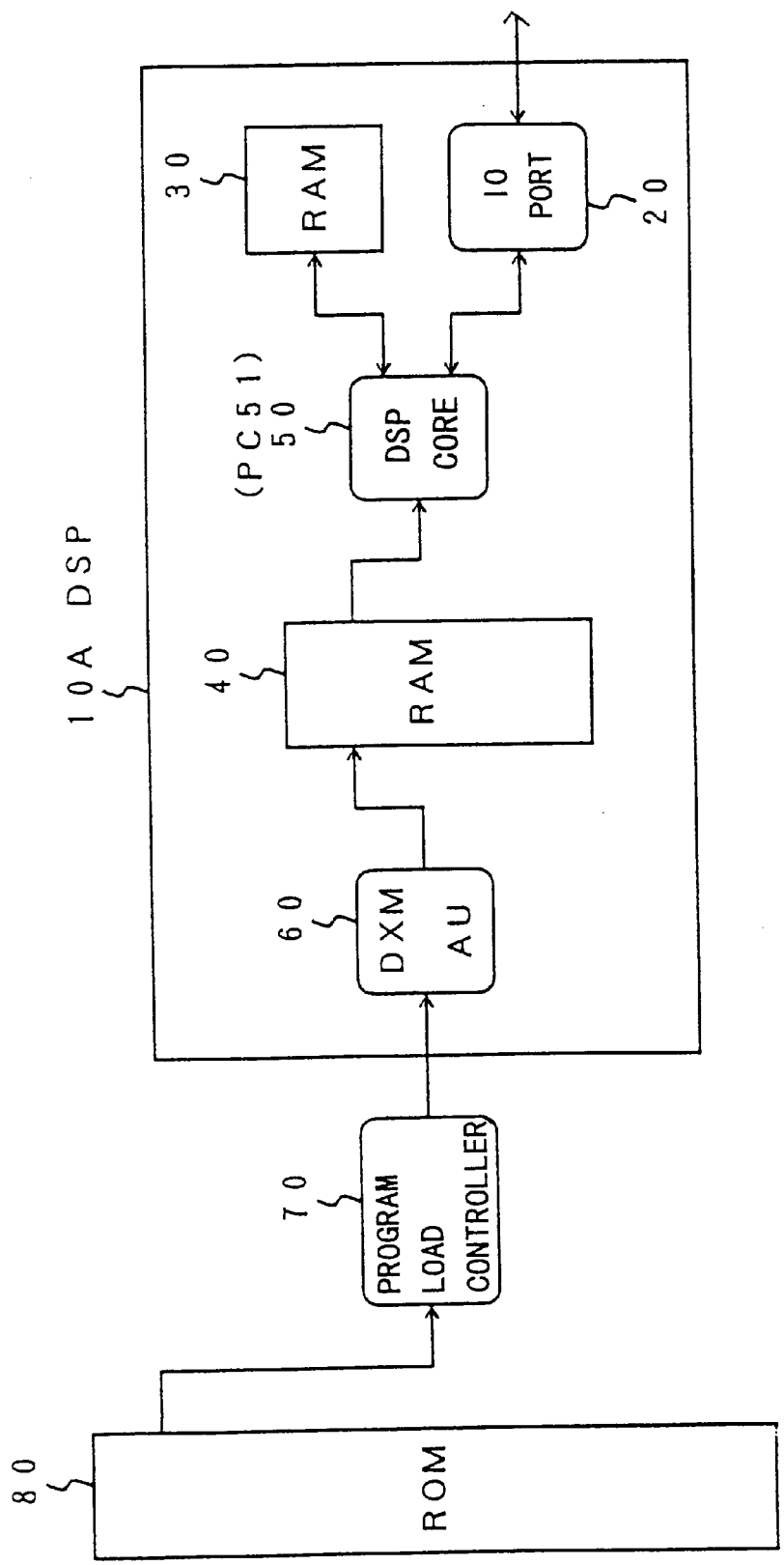
FIG. 4 is a block diagram of a DSP shown in FIG. 3.

FIG. 4 is a block diagram of the DSP 10A shown in FIG. 3.

As shown in FIG. 4, the DSP 10A comprises an input and output (IO) port 20, RAMs 30 and 40, a DSP core 50 and a DXMAU (direct executable memory access unit) 60. The DXMAU 60 is connected to an external PLC (program load controller) 70 which is connected to a ROM 80.

The IO port 20 exchanges information with an external device. The RAM 30 is a work area memory having a work area which stores work data. The RAM 40 is a program memory having an area which stores a DSP program for controlling an operation of the DSP 10A. The DSP core 50 includes a program counter (PC) 51 so as to execute, if necessary, the DSP program stored in the RAM 40 by using work data stored in the RAM 30. The work data used by the DSP 50 is returned to the RAM 30.

The DXMAU 60 replaces a program that has been executed and stored in the work area of the RAM 40 with a new program provided by the external PLC 70.

Figure 5:
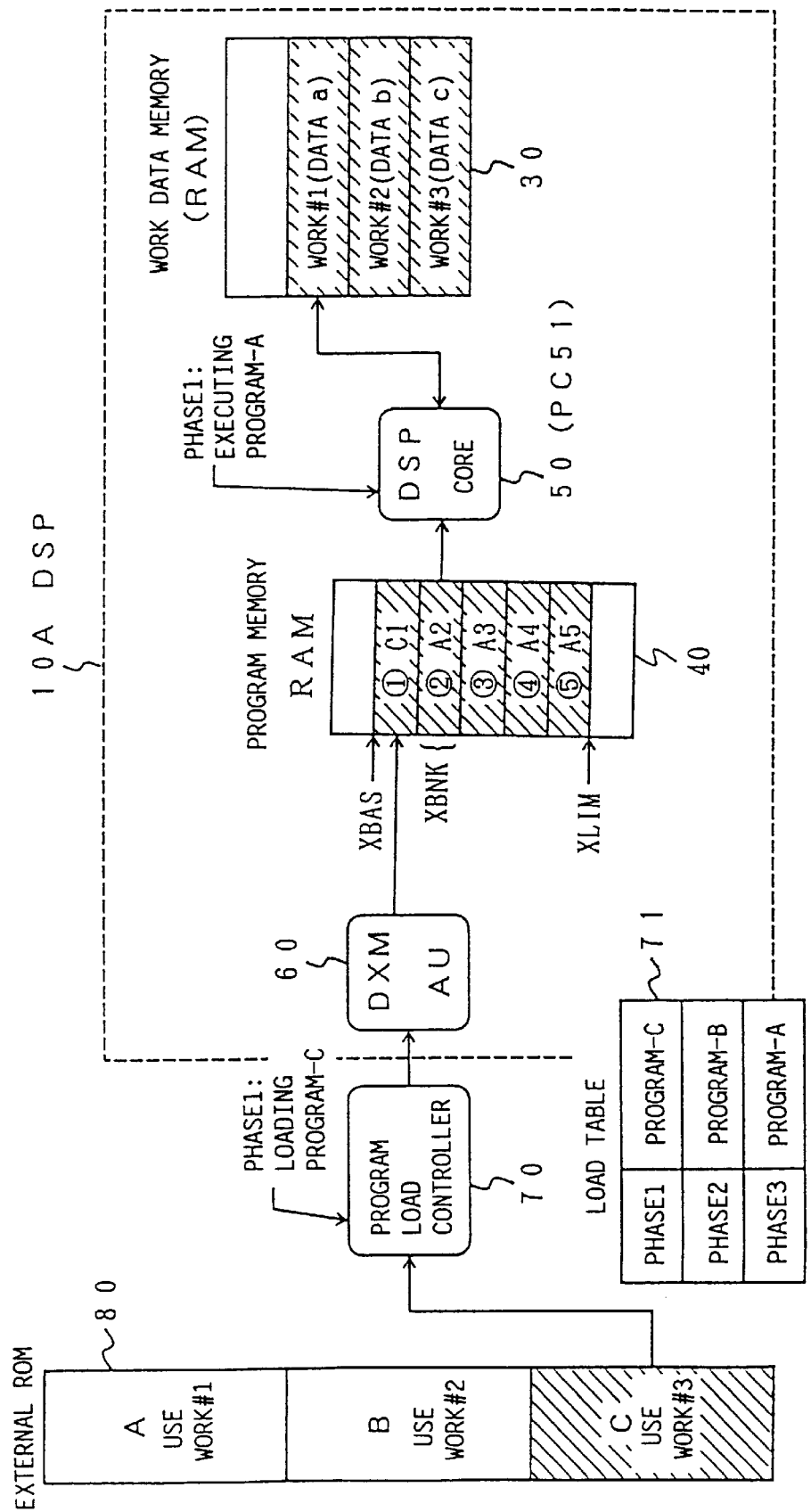
FIG. 5 is a diagram for explaining an operation of the DSP shown in FIG. 4.

FIG. 5 is a diagram for explaining an operation of the DSP 10A shown in FIG. 4.

As shown in FIG. 5, the RAM 30 has work areas Work#1, Work#2 and Work#3 that store work data a, b and c, respectively. Each of the work data a, b and c is divided into five data blocks (a1, a2, a3, a4 and a5), (b1, b2, b3, b4 and b5) and (c1, c2, c3, c4 and c5), respectively.

The ROM 80 is a memory having a capacity sufficient for storing a plurality of programs in a single bank. The ROM 80 stores programs A, B and C that are DSP programs. Each of the programs A, B, and C is divided into five block programs (A1, A2, A3, A4 and A5), (B1, B2, B3, B4 and B5) and (C1, C2, C3, C4 and C5), respectively. Each block program constituting each of the programs A, B and C is executed in an ascending order with respect to the suffix number. For example, the program A is executed in an order of A1, A2, A3, A4 and A5. When the programs A, B and C are executed, work data stored in different work areas in the RAM 30 is used. For example, when the block programs A1, A2, A3, A4 and A5 are executed, the data blocks a1, a2, a3, a4 and a5 stored in the corresponding work area are used, respectively.

The memory area of the RAM 40 includes five banks ①, ②, ③, ④ and ⑤ each of which stores a single block program. The block programs stored in the RAM 40 are executed in an ascending order of the banks. When each of the block programs is executed, the corresponding data block in the RAM 30 is used. During execution of each block program, a, jump of process is allowed within the same bank of the RAM 40 in which the block program being executed is stored. However, a jump to a preceding bank is not allowed. It should be noted to a number of banks provided in the RAM 40 is not limited to five as is in the present embodiment, and a different number of banks may be provided in the RAM 40.

The DXMAU 60 is a unit for replacing programs stored in the memory area of the RAM 40 for each phase. The DXMAU 60 includes three-kinds of registers XBAS, XLIM and XBNK. The register XBAS sets a start point of the memory area of the RAM 40 of which memory area the program is replaced. The register XLIM sets an end point of the memory area of the RAM 40 of which memory area the program is replaced. The register XBNK sets a number of words stored in each bank when the program is replaced.

The DXMAU 60 always monitors a count value of the PC 51 of the DSP core 50. For example, the DXMAU 60 detects a time when the DSP core 50 completes execution of the block program of the bank ① and shifts to execute the block program of the bank ② by referring to the count value of the PC 51. Then, the DXMAU 60 stores a new block program in the bank ① which new block program is obtained from the ROM 80.

The PLC 70 sequentially obtains block programs from the ROM 80, and provides the obtained block programs to the DXMAU 60 in the DSP 10A. The PLC 70 stores a load table information 71 which records a relationship between a timing to provide each block program to the DXMAU 60 and types of the block programs. The PLC 70 determines a block programs to be loaded from a corresponding bank of the ROM 80 based on the load table information 71. It should be noted that the PLC 70 may be provided in the DSP 10A. Additionally, the load table information 71 may be rewritten by a user, if necessary.

A description will now be given, with reference to FIGS. 5 and 6, of an operation of the CODEC according to the first embodiment of the present invention.

Figure 6:
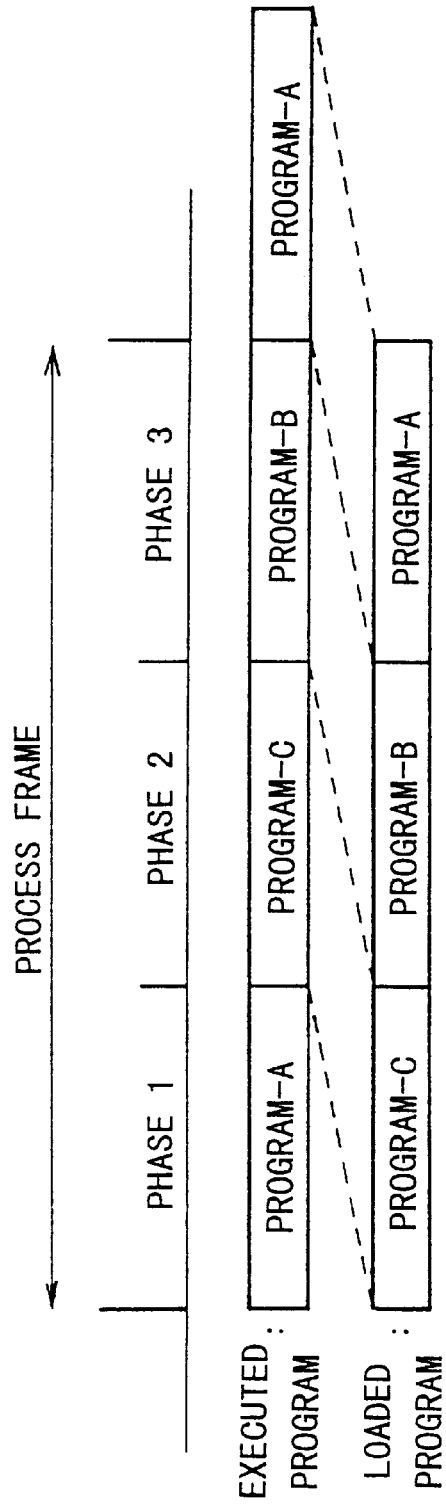
FIG. 6 is a timing chart showing a relationship between programs executed by a DSP core shown in FIG. 4 and programs loaded from an external ROM shown in FIG. 4.

FIG. 6 is a timing chart showing a relationship between programs executed by the DSP core 50 and programs loaded from the RAM 80.

It is assumed that a phase of the DSP 10A is phase 1, and block programs A1, A2, A3, A4 and A5 are stored in the banks ①, ②, ③, ④ and ⑤ of the RAM 40, respectively.

In phase 1, the DSP core 50 completes execution of the block program A1 stored in the bank ① of the RAM 40 and shifts to execution of the program A2. At that time, the DXMAU 60 requests to the PLC 70 a block program to be stored in the bank ①.

Upon receipt the request from the DXMAU 60, the PLC 70 recognizes that a program to be loaded from the ROM 80 is the program C in accordance to the load table information 71 at phase 1. Then, the PLC 70 obtains from the ROM 80 the block program C1 to be executed first from among the block program included in the program C, and provides the block program C1 to the DXMAU 60. The DXMAU 60 stores the block program C1 in the bank ①.

Thereafter, the DSP core 50 completes execution of the block program A2 stored in the barlk ② of the RAM 40 and shifts to execution of the program A3. At that time, the DXMAU 60 requests to the PLC 70 a block program to be stored in the bank ②. Upon receipt of the request from the DXMAU 60, the PLC 70 obtains from the ROM 80 the block program C2, and provides the block program C2 to the DXMAU 60. The DXMAU 60 stores the block program C2 in the bank ②.

After execution of the block program A5 of the bank ⑤ is completed by repeating the above-mentioned operation, the execution of the program A in phase 1 is completed. At this time, the operation enters a phase 2.

Thereafter, the DSP core 50 executes the block program C1 stored in the bank ① by using the data block c1 stored in the RAM 30. At this time, the block program C5 is stored in the bank ⑤. Accordingly, similar to the phase 1, the program C is executed in phase 2 by sequentially executing the block programs C1, C2, C3, C4 and C5.

As mentioned above, the block programs stored in the RAM 40 are sequentially rewritten on an individual bank basis, and the entire program has been replaced with a new program. Accordingly, the DSP 10A can perform a process according to a plurality of algorithms, that is, the DSP 10A achieves a multi-algorithm process.

It should be noted that the number of data blocks and the number of block programs are not limited to five as is described in the above-mentioned embodiment.

Additionally, although a multi-algorithm process is described in the above-mentioned embodiment, the DSP 10A can also execute a large amount of program having that exceeds the memory capacity of the RAM 40.

Figure 7:
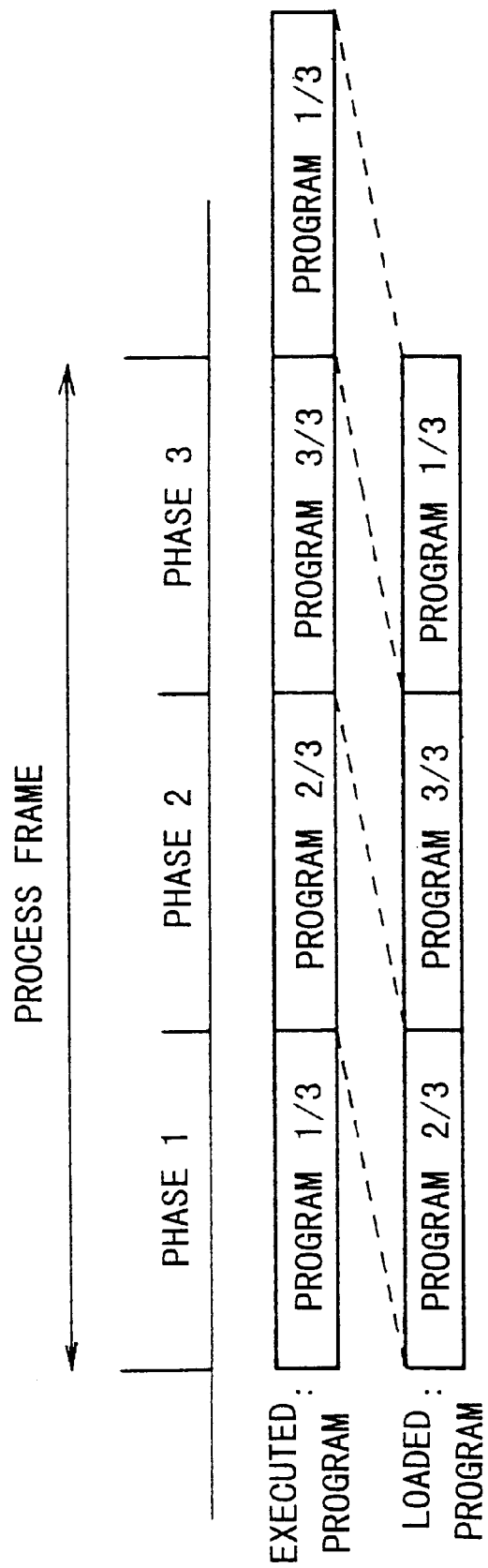
FIG. 7 is a timing chart showing a relationship between small programs which are obtained by dividing a program D to be executed by the DSP and the small programs to be loaded from the external ROM.

FIG. 7 is a timing chart showing a relationship between small programs which are obtained by dividing a program D to be executed by the DSP 10A and the small programs to be loaded from the ROM 80. The program D has a capacity that cannot be stored in the banks of the RAM 40. The program D is divided into three small programs 1/3, 2/3 and 3/3 each of which has a capacity that can be stored in the RAM 40. Each of the small programs 1/3, 2/3 and 3/3 corresponds to the above-mentioned plurality of programs A, B and C. The small programs 1/3, 2/3 and 3/3 are sequentially stored in the RAM 40.

As shown in FIG. 7, the small programs 1/3, 2/3 and 3/3 are sequentially executed by the DSP core 50 in the phases 1, 2 and 3, respectively. On the other hand, the small programs 1/3, 2/3 and 3/3 are loaded from the RAM 80 to the DSP 10A in each phase. The loaded small programs are stored in the banks of the RAM 40 on an individual bank basis so that each of the small programs is stored in one of the banks of which program is executed. The execution of the program D is completed by sequentially executing the small programs 1/3, 2/3 and 3/3. Accordingly, the program D having a capacity exceeding the memory capacity of the RAM 40 can be executed by the DSP 10A.

Figure 8:
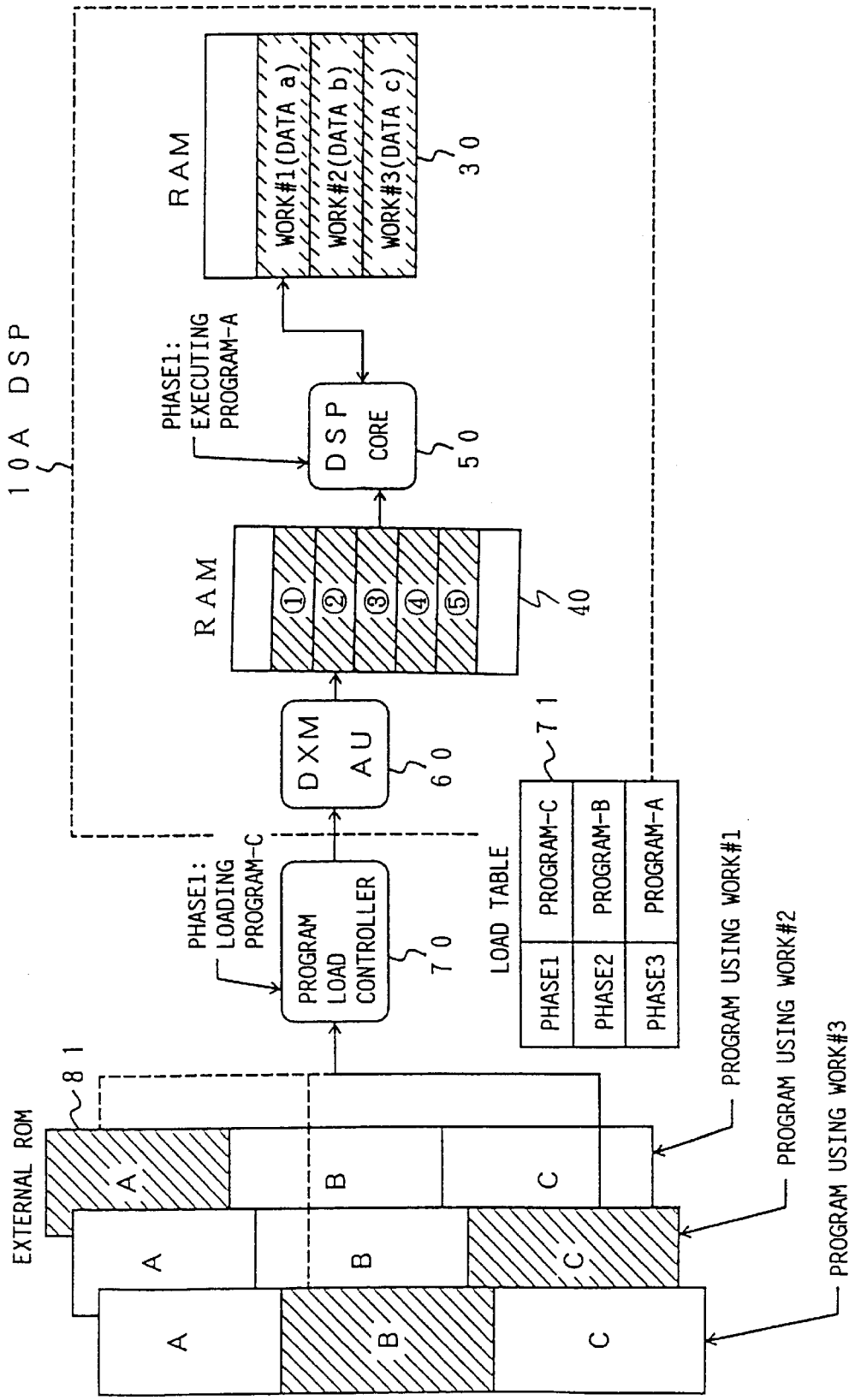
FIG. 8 is a diagram of the DSP connected to another external ROM.

FIG. 8 is a diagram of the DSP 10A connected to an external ROM 81. As shown in FIG. 8, the ROM 81 stores all objects corresponding to all combinations of the work areas of the RAM 30 to be referred to by the DSP core 50 and the programs to be executed by the DSP core 50.

For example, when the DSP 10A is used with the ROM 80 as shown in FIG. 5, the work data referred to by the DSP core 50 when the DSP core 50 executes the program A is limited to the work data a stored in the area Work#1. Accordingly, when the DSP core 50 executes the program A, the DSP core 50 cannot refer to the work data b and the work data c. In order to eliminate such inconvenience, the external ROM 81 shown in FIG. 8 is connected to the DSP 10A so that the DSP 10A can execute the same program by referring to different work data.

Figure 9:
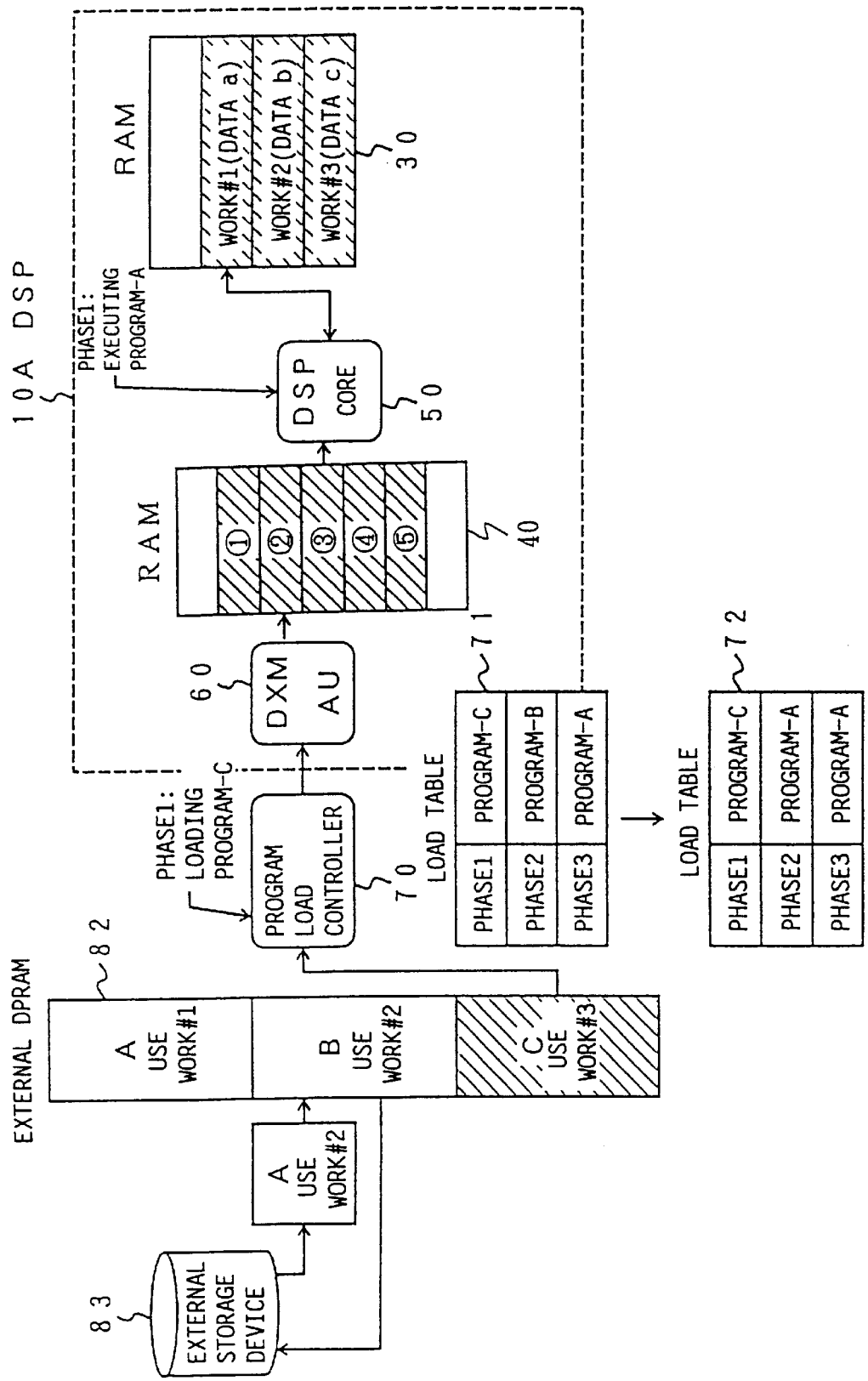
FIG. 9 is a diagram of the DSP connected to an external dual port RAM which is connected to an external storage device.

FIG. 9 is a diagram of the DSP 10A connected to an external dual port RAM (DPRAM) 82 which is connected to an external storage device 83 such as a hard disc drive.

It is assumed that the program A is read from the external memory device 83 and stored instead of the program B in an area of the DPRAM 82 in which the program B should be stored, the program A being set to use the work data b in the area Work#2 of the RAM 30.

In such a case, The DPRAM 82 stores both the program A which is set to use the work data a of the area Work#1 and the program A which is set to use the work data b of the area Work#2. Accordingly, the DSP 10A can execute the program A by using both the work data a and the work data b.

Accordingly, even if a memory capacity of the external ROM connected to the DSP 10A is not sufficient to store all objects corresponding to all combinations of the work areas of the RAM 30 and the programs to be executed as is in the ROM 81 shown in FIG. 8, the DSP 10A can execute the same program by referring to different work data by downloading the program from the external storage device 83 to the DPRAM 82, if necessary.

When the program is downloaded from the external storage device 83 to the DPRAM 82, the load table information 71 is replaced with load table information 72 as shown in FIG. 9 in response to the program loaded to the DPRAM 82. According to the load table information 72, the program A which is stored in the DPRAM 82 and is set to use the work data b of the area Work#2 is loaded to the DSP 10A by the PLC 70

By using a structure in which programs can be downloaded from an external device as mentioned above, an order of loading and execution of the programs fixed by the load table information 71.

Figure 10:
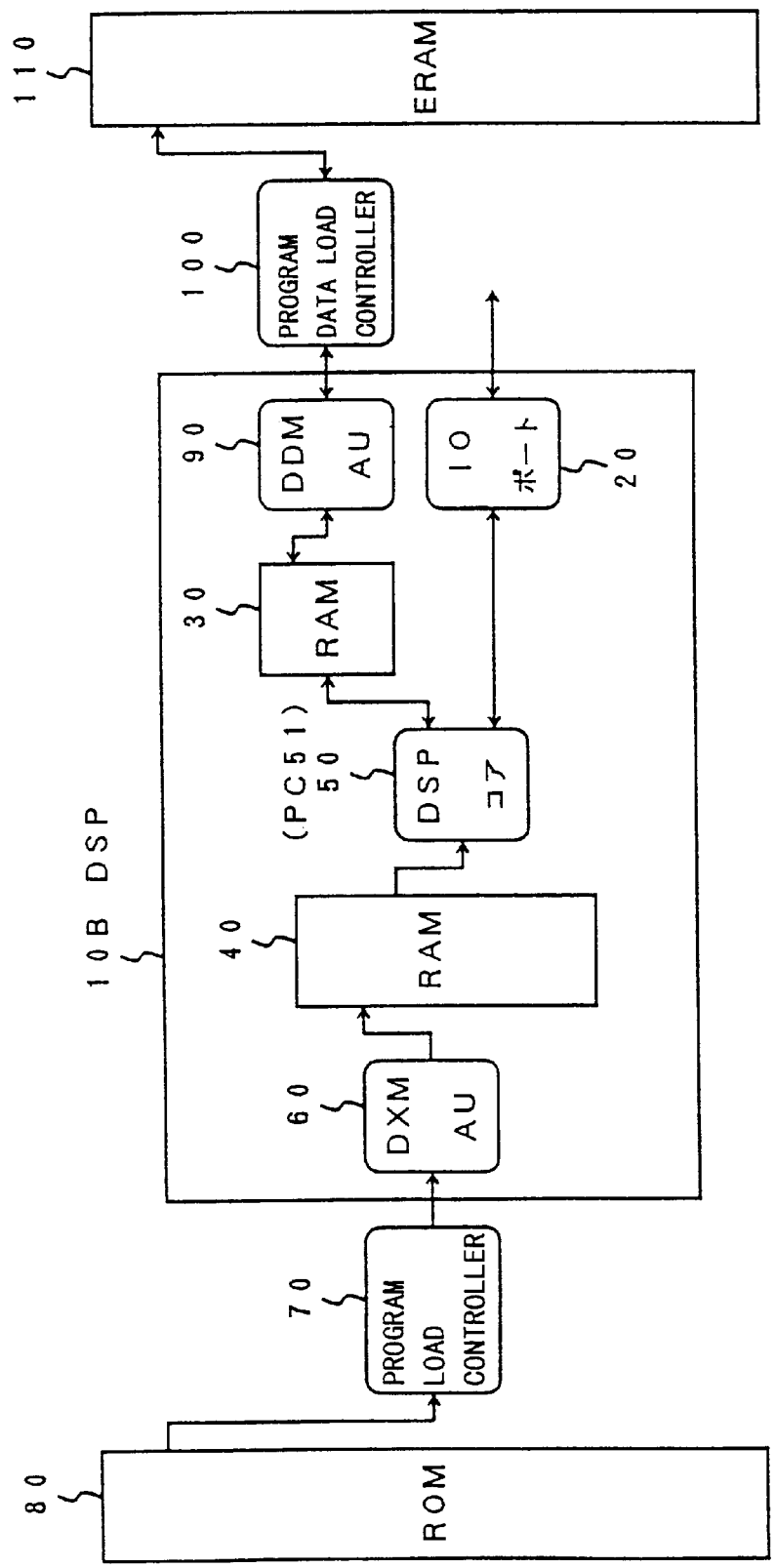
FIG. 10 is a block diagram of a DSP 10B provided in a CODEC according to a second embodiment of the present invention.

FIG. 10 is a block diagram of a DSP 10B provided in a CODEC according to a second embodiment of the present invention. In FIG. 10, parts that are the same as the parts shown in FIG. 4 are given the same reference numerals, and descriptions thereof will be omitted.

As shown in FIG. 10, the DSP 10B has a structure in which a direct data memory access unit (DDMAU) 90 is added to the DSP 10A according to the above-mentioned first embodiment. The DDMAU 90 is connected to an external program data load controller (PDLC) 100 which is connected to an extended random access memory (ERAM) 110.

The DDMAU 90 sequentially replaces contents of the banks of the RAM 30, in which the data blocks used for executing the block programs are stored, with new data PDLC 100 separately provided from the DSP 10B. The ERAM 110 is an external data memory to store the work data a, b and C.

Figure 11:
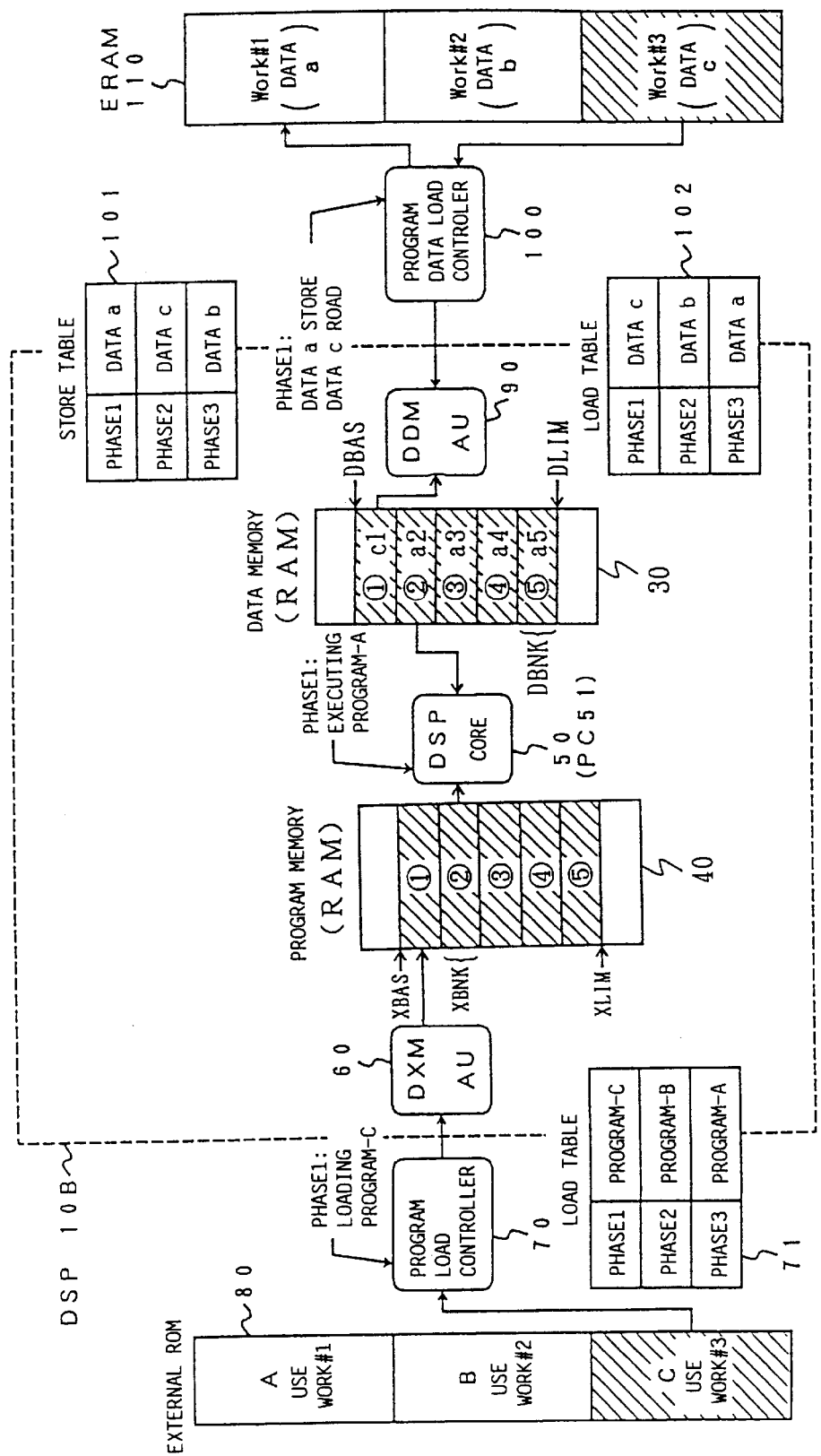
FIG. 11 is a diagram for explaining an operation of a DSP shown in FIG. 10.

FIG. 11 is a diagram for explaining an operation of the DSP 10B.

As shown in FIG. 11, the memory area of the RAM 30 includes the five banks ①, ②, ③, ④ and ⑤ each of which stores a single data block. The banks of the RAM 40 and the banks of the RAM 30 are related to on a one-to-one basis so that a data block to be used for a block program to be executed is determined according to the relationship between the banks. For example, when the block program stored in the bank ① of the RAM 40 is executed, the data block stored in the bank ① of the RAM 30 is used. When one block program is executed, data blocks stored in the corresponding bank of the RAM 30 can be freely used, but data blocks stored in other banks cannot be used. Additionally, the number of banks of the RAM 30 is not limited to five as described in the present embodiment.

The DDMAU 90 is a unit for rewriting work data stored in the memory area of the RAM 30 for each phase. The DDMAU 90 includes three-kinds of registers DBAS, DLIM and DBNK. The register DBAS sets a start point of the memory area of the RAM 30 of which memory area the data is replaced. The register DLIM sets an end point of the memory area of the RAM 40 of which memory area the data is replaced. The register DBNK sets a number of words stored in each bank when the data is replaced.

The DDMAU 90 always monitors a count value of the PC 51 of the DSP core 50. For example, the DDMAU 90 detects a time when the DSP core 50 completes execution of the block program of the bank ① of the RAM 40 and shifts to execute the block program of the bank ② by referring to the count value of the PC 51. Then, the DDMAU 90 returns the data block in the bank ① of the RAM 30 to the ERAM 110, and stores a new data block in the bank ① of the RAM 30 which new data block is obtained from the PDLC 100.

The DDMAU 90 determines that the block program to -be executed is changed when an access pointer of the RAM 30 is changed to point a next memory bank of the RAM 30. Then the DDMAU 90 returns the data block in the previously pointed memory bank to the ERAM 110. At the same time, the DDMAU 90 write a new data block provided from the ERAM 110 in the previously pointed memory bank.

The PDLC 100 obtains data blocks from the ERAM 110 which is an external data memory, and provides the obtained data blocks to the DDMAU 90 in the DSP 10B. The PDLC 100 stores a load table information 102 which records a relationship between a timing (phase) to provide data to the DDMAU 90 and types of the data. The PDLC 100 also stores a store table information 101 which records a relationship between a timing to provide data from the DSP 10B to the ERAM 110 and types of the data. The PDLC 100 may be provided in the DSP 10B. Additionally, the load table information 102 and the store table information may be rewritten by a use, if necessary.

A description will now be given, with reference to FIGS. 11 and 12, of an operation of the CODEC according to the second embodiment of the present invention.

Figure 12:
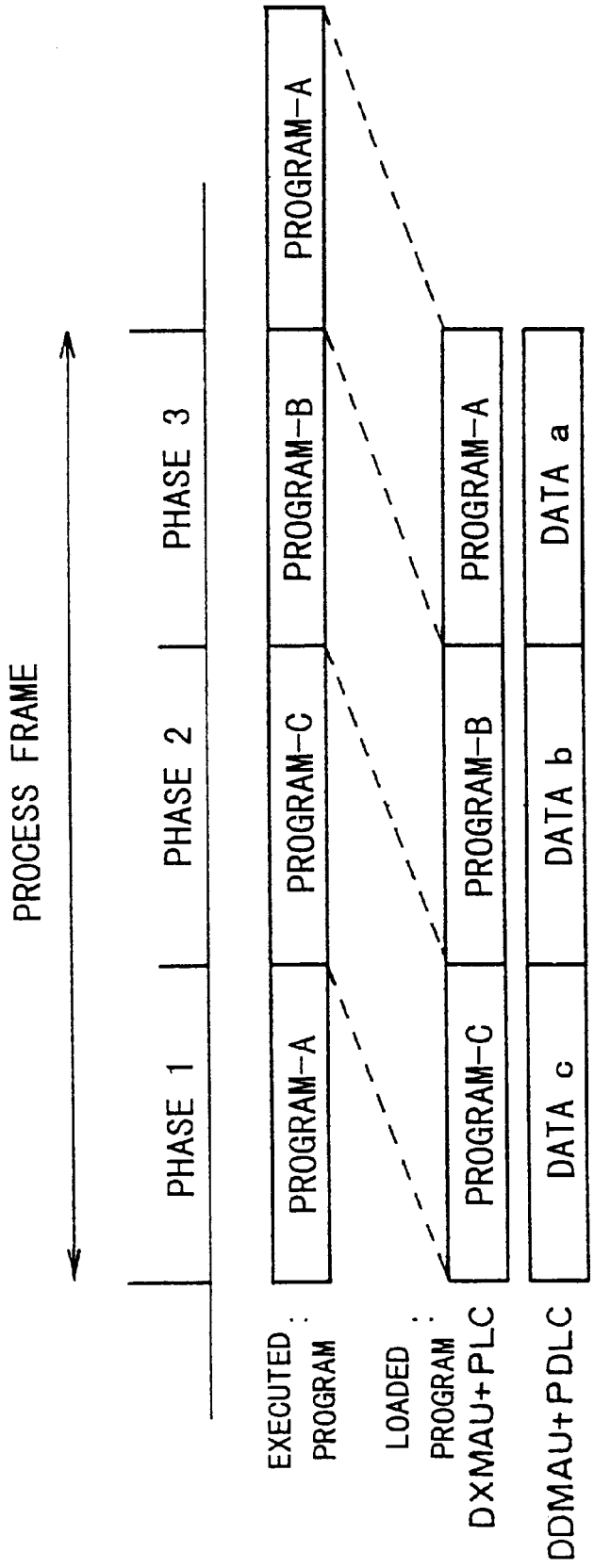
FIG. 12 is a timing chart showing a relationship between programs executed by the DSP, programs loaded from a ROM and work data loaded from an ERAM shown in FIG. 10.

FIG. 12 is a timing chart showing a relationship between programs executed by the DSP core 50, programs loaded from the RAM 80 and work data loaded from the ERAM 110.

It is assumed that the DSP 10B is in phase 1, and block programs A1, A2, A3, A4 and A5 are stored in the banks ①, ②, ③, ④ and ⑤ of the RAM 40, respectively, and data blocks a1, a2, a3, a4 and a5 are stored in the banks ①, ②, ③, ④ and ⑤ of the RAM 30, respectively.

In phase 1, the DSP core 50 completes execution of the block program A1 stored in the bank ① of the RAM 40 and shifts to execution of the program A2. At that time, the DXMAU 60 requests to the PLC 70 a block program to be stored in the bank ① of the RAM 30.

Upon receipt of the request from the DXMAU 60, the PLC 70 obtains from the ROM 80 the block program C1, and provides the block program C1 to the DXMAU 60. The DXMAU 60 stores the block program C1 in the bank ①.

At this time, upon receipt of the request from the DDMAU 90, the PDLC 100 stores the data block a1 in a predetermined memory area of the ERAM 110 according to the store table information 101, the data block a1 being no longer needed to be stored in the bank ① of the RAM 30 as the execution of the program A1 progresses. At the same time, the PDLC 100 obtains the data block c1 from the ERAM 110 according to the load table information 102, and provides the obtained data block c1 to the DDMAU 90. The DDMAU 90 stores the data block c1 in the bank ① of the RAM 30.

Thereafter, the DSP core 50 completes execution of the block program A2 stored in the bank ② of the RAM 40 and shifts to execute the program A3 stored in the bank ③ by using the data block a3. At that time, the DXMAU 60 requests to the PLC 70 a block program to be stored in the bank ② of the RAM 40. At this time, the DDMAU 90 requests to the PDLC 100 a data block to be stored in the bank ② of the Ram 30.

Upon receipt of the request from the DXMAU 60, the PLC 70 obtains from the ROM 80 the block program C2 according to the load table information 71, and provides the block program C2 to the DXMAU 60. The DXMAU 60 stores the block program C2 in the bank ② of the RAM 40

At this time, upon receipt of the request from the DDMAU 90, the PDLC 100 stores the data block a2 in a predetermined memory area of the ERAM 110 according to the store table information 101, the data block a2 being no longer needed to be stored in the bank ② of the RAM 30 as the execution of the program A2 progresses. At the same time, the PDLC 100 obtains the data block c2 from the ERAM 110 according to the load table information 102, and provides the obtained data block c2 to the DDMAU 90. The DDMAU 90 stores the data block c2 in the bank ② of the RAM 30.

After execution of the block program A5 of the bank ⑤ is completed by repeating the above-mentioned operation, the execution of the program A in phase 1 is completed. Then, the operation enters phase 2. Thereafter, the DSP core 50 executes the block program C1 stored in the bank ① by using the data block c1 stored in the RAM 30. Accordingly, similar to the phase 1, the program C is executed in phase 2 by sequentially executing the block programs C1, C2, C3, C4 and C5.

As mentioned above, the block programs stored in the RAM 40 and the work data stored in the RAM 30 are sequentially rewritten on an individual bank basis, and the entire program and work data have been replaced with a new program and enters a new phase. Accordingly, the DSP 10B can perform a process according to a plurality of algorithms, that is, the DSP 10B achieves a multi-algorithm process.

It should be noted that the number of data blocks and the number of block programs are not limited to five as is described in the above-mentioned embodiment.

Additionally, although a multi-algorithm process is described in the above-mentioned embodiment, the DSP 10B can also execute a large amount of program that exceeds the memory capacity of the RAM 40.

Figure 13:
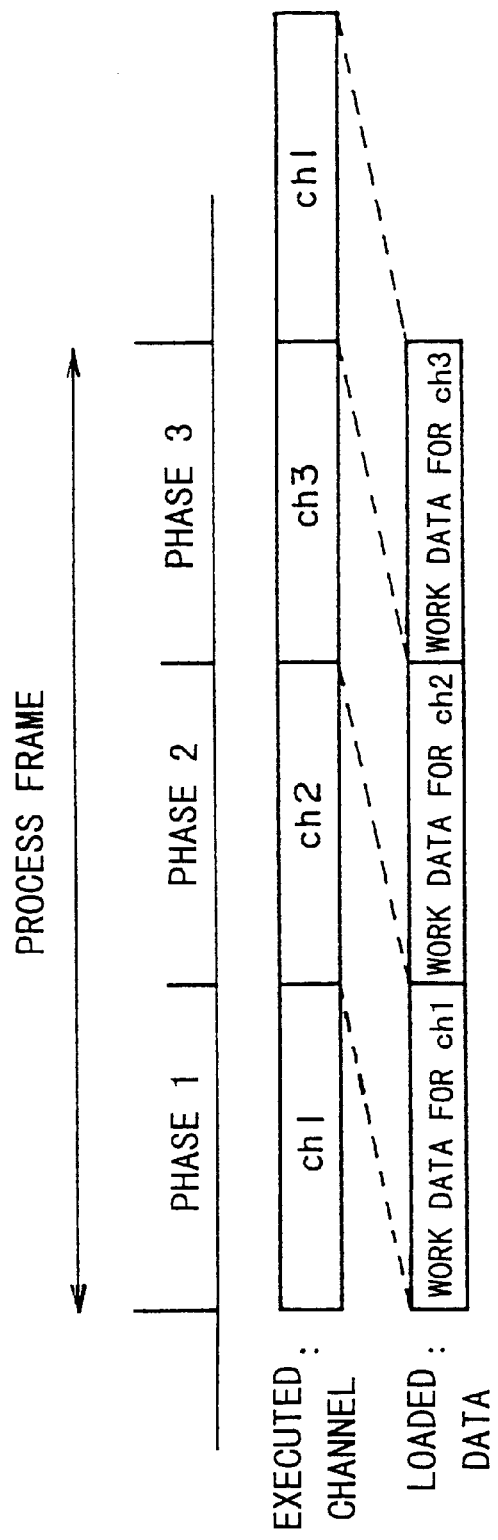
FIG. 13 is a timing chart showing a relationship between channels 1, 2, and 3 and work data used when programs corresponding to each channel is executed.

FIG. 13 is a timing chart showing a relationship between channels (ch) 1, 2, and 3 and the work data used when the programs corresponding to each channel is executed. An amount of the work data is so large that is cannot be stored in the banks of the RAM 30. The work data is divided into three data blocks for ch1, ch2 and ch3 and are sequentially loaded and used when the respective programs are executed.

When the DSP 10B is operated, sets of new work data are sequentially loaded to the memory area of the RAM 30 according to the load table information 102 in each phase so as to replace work data corresponding to a program that has been completed.

Accordingly, the same program is executed, but the work data for a subsequent channel is loaded for each process phase so the loaded work data is used for execution of the program in the subsequent phase. According to the above-mentioned structure, the DSP 10B can perform a multi-channel process even when a capacity of the RAM 30 is not sufficient for storing the entire work data.

It should be noted that the ROM connected to the DSP 10B to store the programs may be the ROM 81 or the DPROM 82 which obtains programs form the external storage device 83 as described in the above-mentioned second embodiment.

In the present embodiment, since the programs executed or loaded is changed for each phase which continues for a predetermined time period, a process time of each of the programs must be equal to each other. Specifically, when a unit process time of the operation of the DSP is divided into N phases, each of the programs executed by being loaded from the external ROM to the RAM 40 is required to be completed within a time period less than 1/N of the unit process time.

Accordingly, in order to equalize the process time of the programs, the RAM 40 stores a platform program P in an area other than the memory area in which the programs are rewritten.

Figure 14:
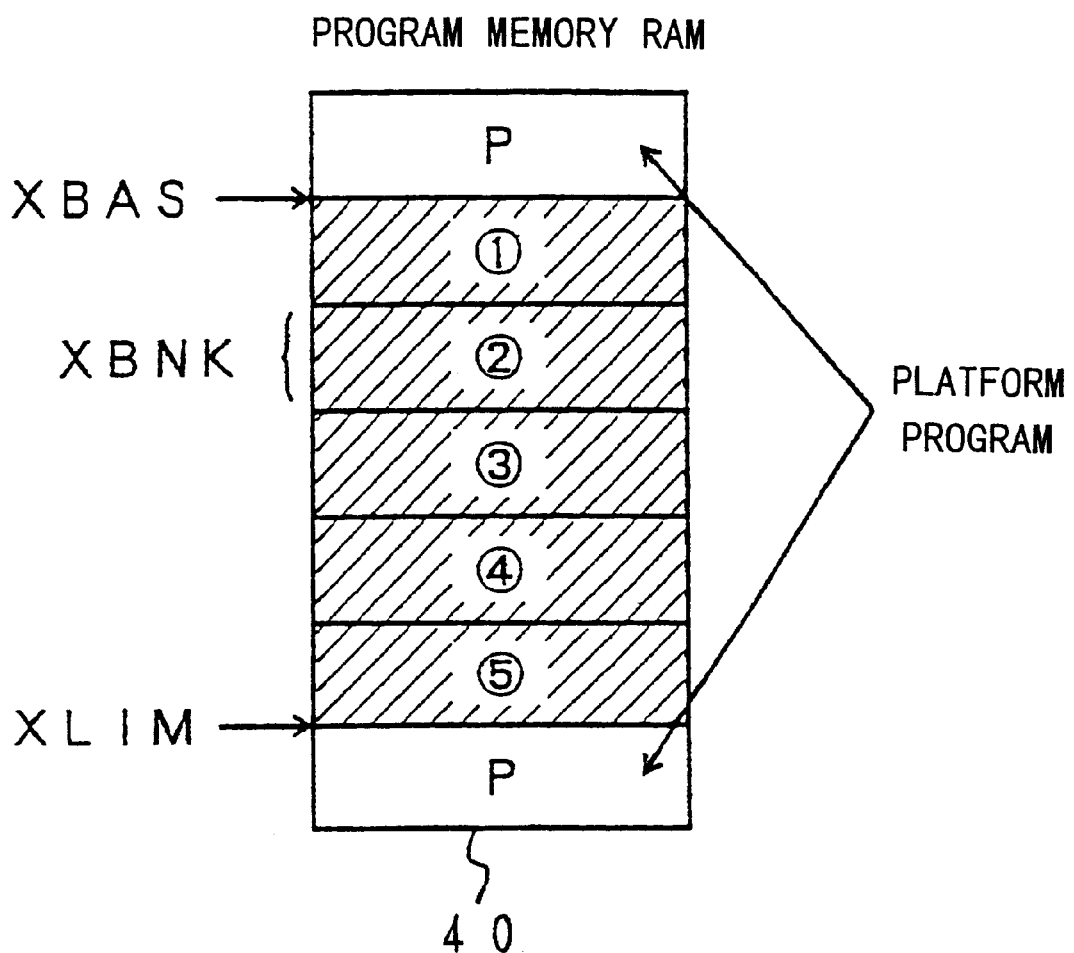
FIG. 14 is an illustration of a structure of a RAM for storing programs.

FIG. 14 is an illustration of a structure of the RAM 40. The RAM 40 has a platform structure including five banks. The RAM 40 stores a platform program P in an area other than the memory area containing the five banks in which the DSP programs are stored. The platform program P is provided for equalizing the process time of each of the programs stored in the five banks.

Figure 15:
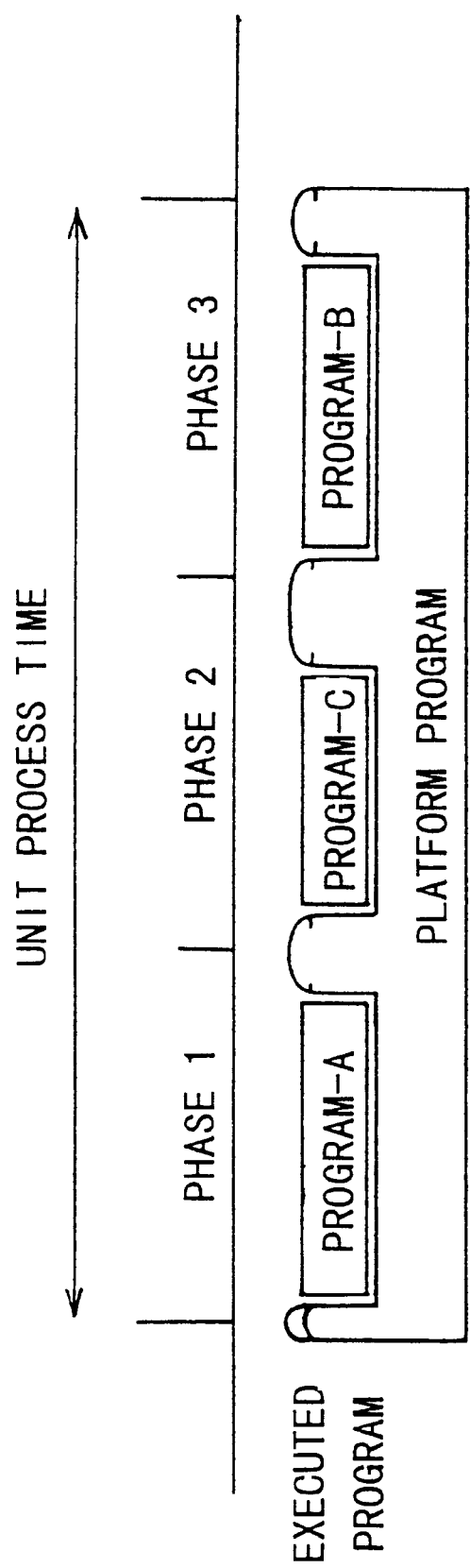
FIG. 15 is an illustration for explaining a platform program.

FIG. 15 is an illustration for explaining the platform program.

As shown in FIG. 15, if a time period remains when the execution of the program A is completed in phase 1, an idling operation is performed in accordance with the platform program P. When the operation enters the phase 2, the program to be executed is changed to the program C which has been newly loaded to the RAM 40. Thereafter, a time period remaining after the execution of the program C is completed, an idling operation is performed in accordance with the platform program P. Accordingly, the process time of the programs including the idling time of each of the phases can be equalized by adjusting the idling time of each phase.

Recognition of each phase in the DSP 10A or the DSP 10B can be achieved by providing a signal MFC/N to the DSP 10A or the DSP 10B. The signal MFC/N is obtained by dividing a master frame clock signal MFC by N. The master frame clock signal MFC is also provided to the PLC 70 or the PDLC 100 and is in synchronization with the unit process time.

Figure 16:
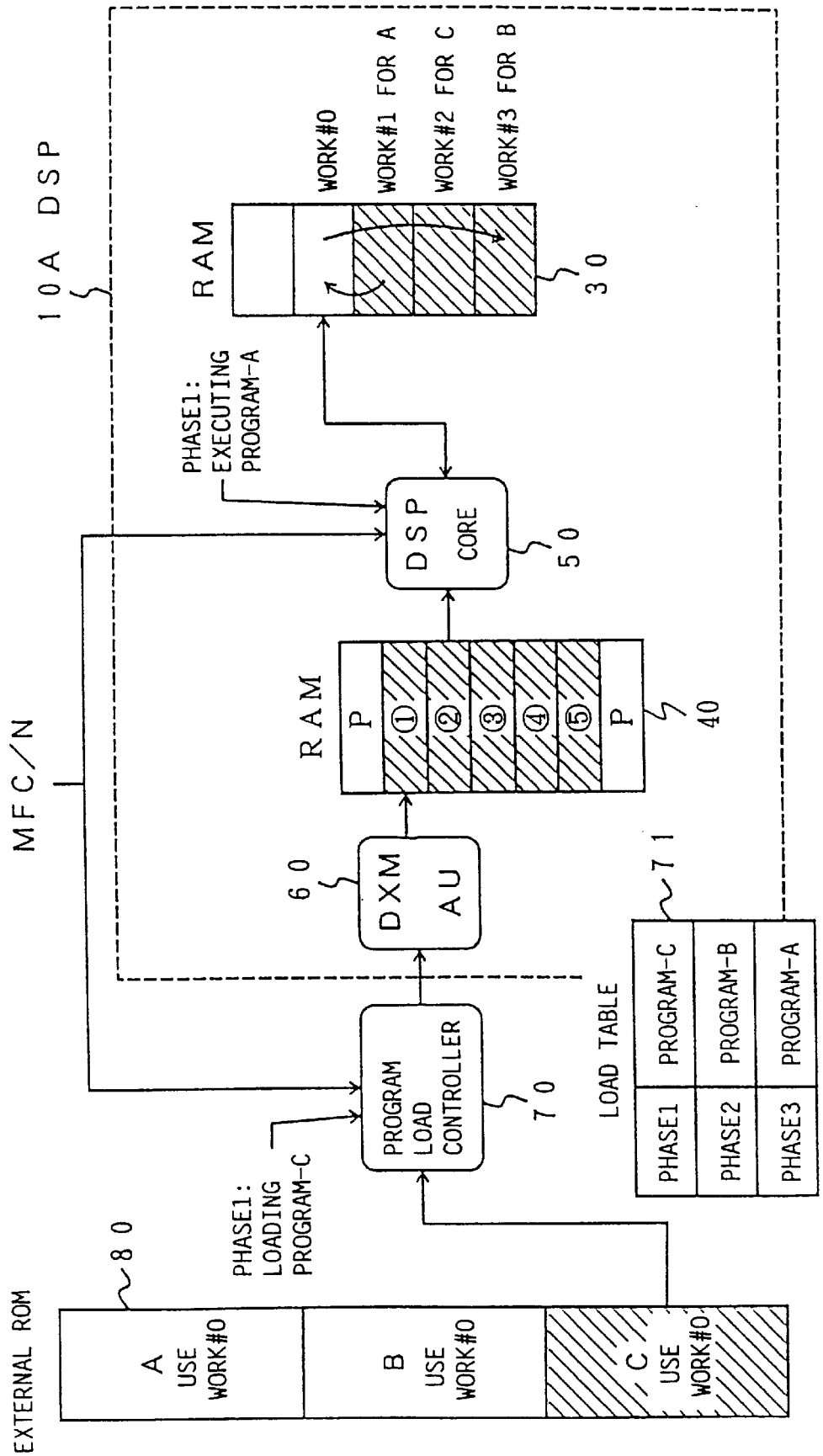
FIG. 16 is a diagram of a structure of the DSP including the RAM which stores the platform program.

FIG. 16 is a diagram of a structure of the DSP 10A including the RAM 40 which stores the platform program P. A description will now be given below an example of a method for accessing work data when a multi-algorithm process is performed by the DSP 10A which has the platform program P.

As shown in FIG. 16, the RAM 40 stores the platform program P. The RAM 30 includes work areas Work#0, Work#1, Work#2 and Work #3.

The work data a, b and c for the programs A, B and C are stored in the work areas Work#1, Work#2 and Work #3, respectively. The work area Work#0 is a temporary work are in which one of the sets of work data a, b and c is stored in response to the process phase.

For example, during an idling period from a time when the program A1 is completed in phase 1 until a time when the operation enters phase 2, the work data a is copied (returned) to the work area Work#1 in accordance with the platform program P and the work data c to be used in phase 2 is copied (transferred) from the work area Work#3 to the work area Work#0. This operation is referred to as a swap process. Each of the work areas Work#0, Work#1, Work#2 and Work#3 has a memory capacity sufficient for storing the work data used by the programs.

The thus-structured DSP 10A can obtain the work data necessary for the program to be executed by the DSP core 50 accessing the same area (Work#0) of the data memory in each phase.

Figure 17:
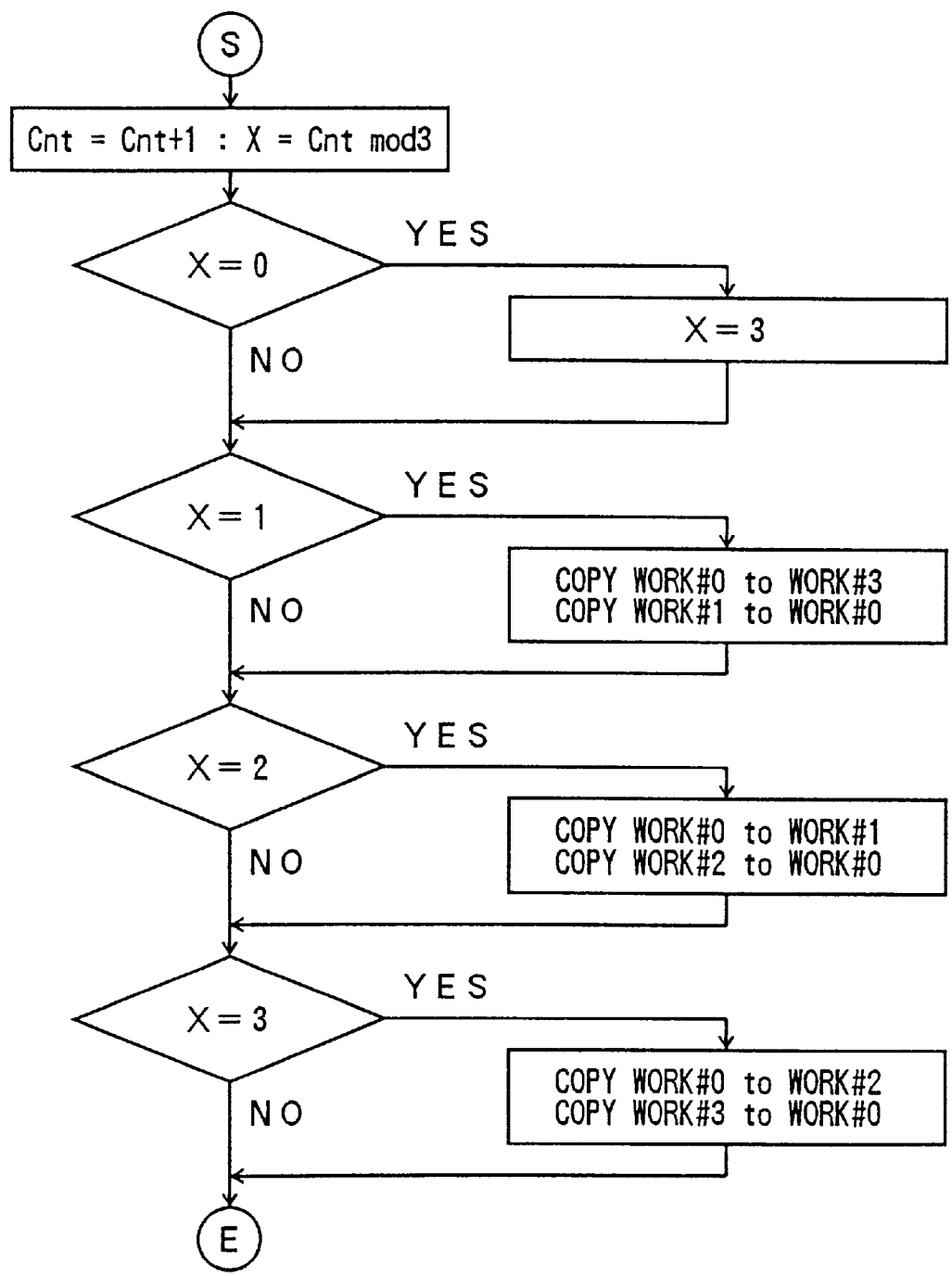
FIG. 17 is a flowchart of a swap process for work data according to the platform program.

FIG. 17 is a flowchart of a swap process for the work data according to the above-mentioned platform program.

The platform program P determines whether the subsequent phase is one of the phases 1, 2 and 3 according to a value of an integer variable X. The value of the variable X is calculated based on a value (initial value 1) of an integer variable Cnt. Then, the work data to be loaded to the DSP core 50 is determined based on the value of the variable X. The calculation of the value of the variable X is as follows.

First, the value of the integer variable Cnt is 1. When the DSP 10A receives the above-mentioned signal MFC/N, the value of the variable Cnt is increased by 1. Then, the increased value of the variable Cnt is divided by 3, and a result is set to the value of the integer variable X. It should be noted that when the result of the calculation is zero (X=0), 3 is set to the value of the variable X instead of zero.

The value of the variable X is sequentially changed as 1, 2, 3, 1, 2, 3, 1 . . . each time the signal MFC/N is provided to the DSP 10A.

As shown in FIG. 17, the work data stored in the work area Work#0 is returned to a predetermined work area in response to the value of the variable X calculated by dividing the variable Cnt by 3, and, instead, the work data to be used in the subsequent phase is copied to the work area Work#0.

For example, if the result of the calculation which divides the variable Cnt by 3 is 1 (X=1), the work data stored in the work area Work#0 is copied to the work area Work#3, and, instead, the work data stored in the work area Work#1 is copied to the work area Work#0.

Figure 18:
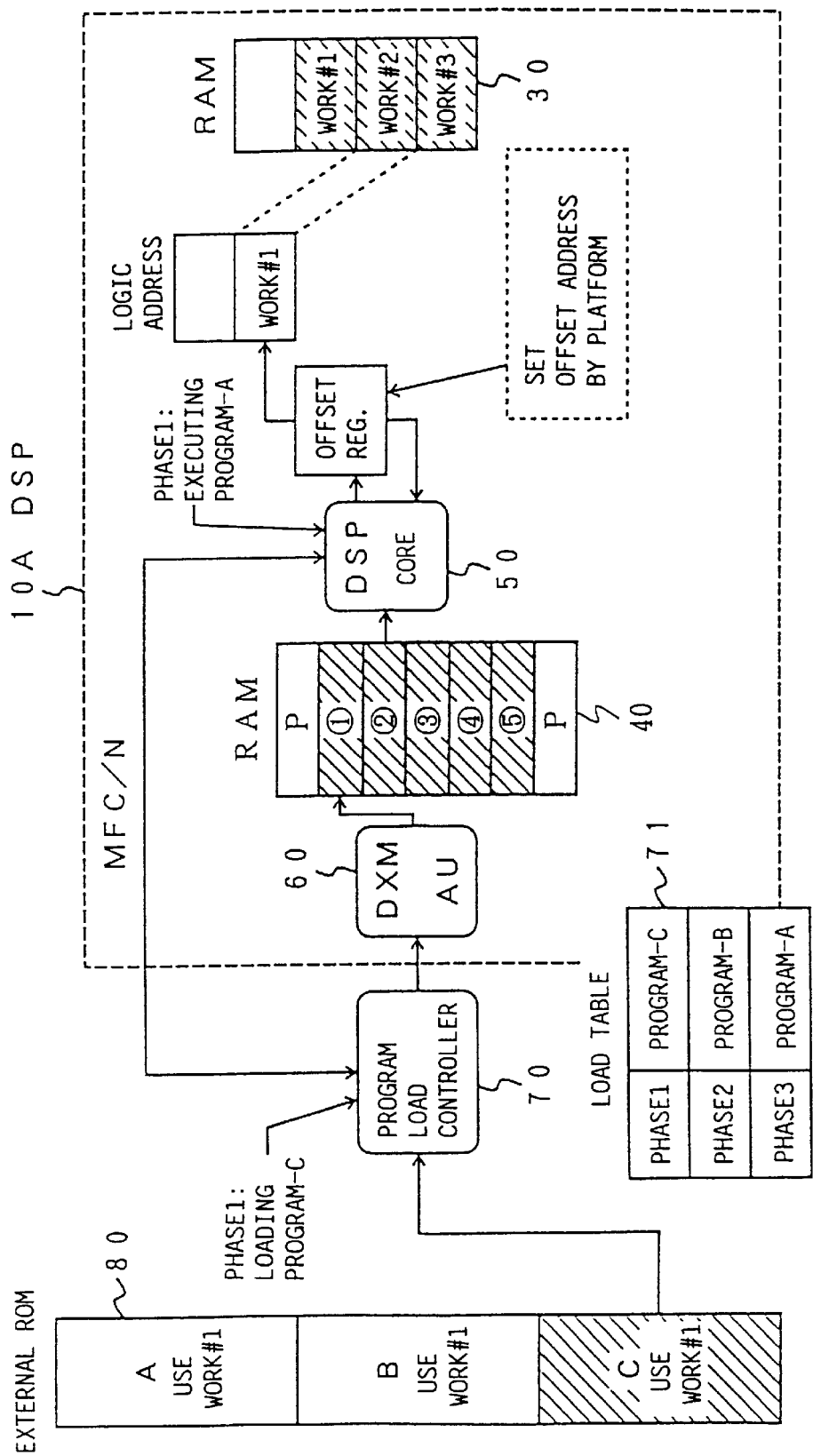
FIG. 18 is a diagram of the DSP for explaining another method for accessing work data.

FIG. 18 is a diagram of the DSP 10A for explaining another method for accessing the work data. The DSP 10A shown in FIG. 18 has logic addresses with respect to the data memory of the RAM 30. As shown in FIG. 18, in the DSP 10A, addressing means for changing the data memory areas of the RAM 30 and the logic addressing with respect to the data memory area of the RAM 30 is supported by hardware of the DSP 10A. Accordingly, the DSP core 50 can always access one of the sets of work data a, b and c stored in the work areas Work#1, Work#2 and Work#3 of the RAM 30 by providing an offset address to an offset register prior to execution of a program in each process phase.

The above-mentioned DXMAU 60, PLC 70, DDMAU 90 and PDLC 100 have the following structures.

Figure 19:
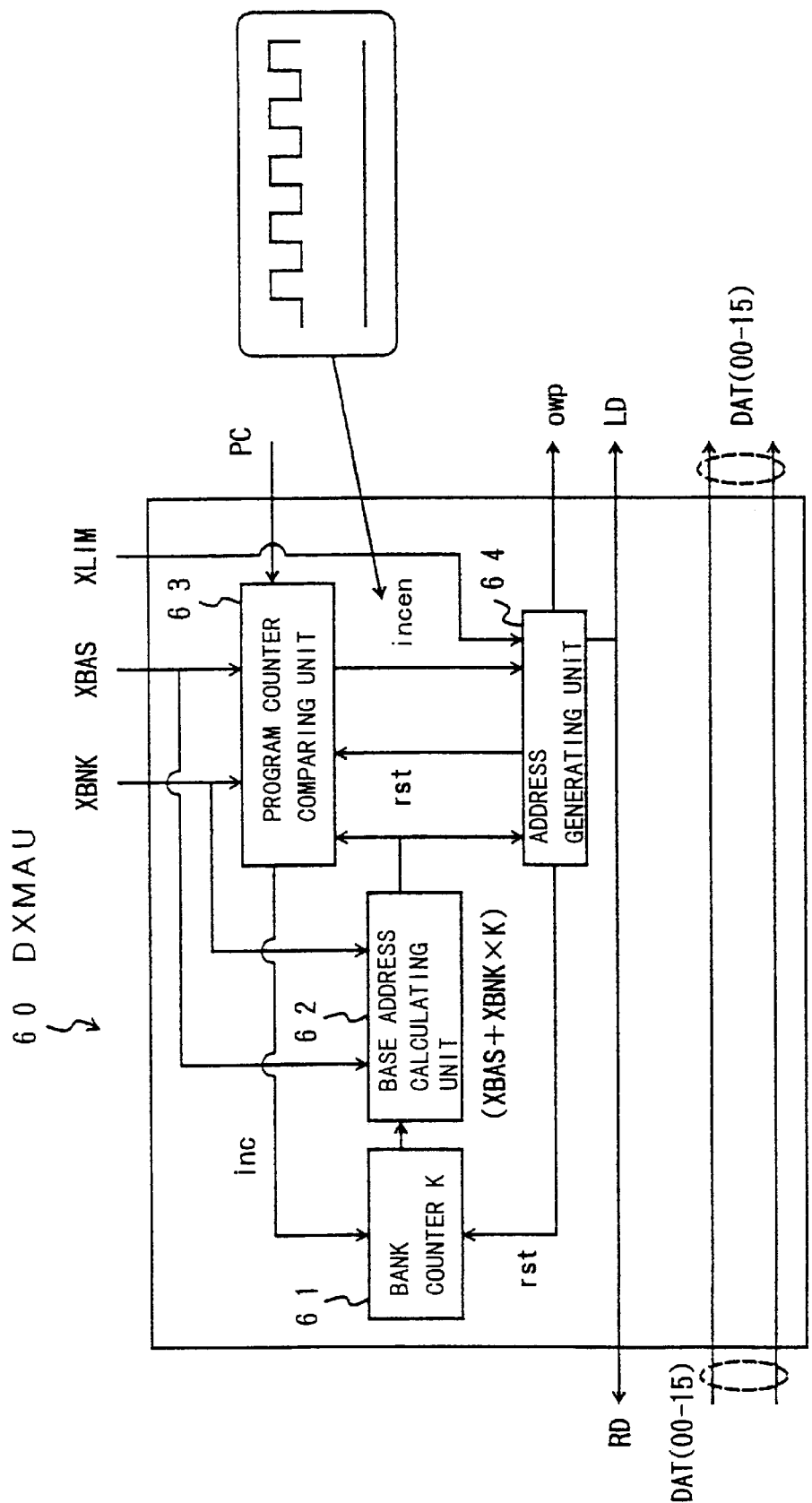
FIG. 19 is a block diagram of a DXMAU shown in FIG. 4.

FIG. 19 is a block diagram of the DXMAU 60. As shown in FIG. 19, the DXMAU 60 comprises a bank counter 61, a base address calculating unit 62, a program counter comparing unit 63 and an address generating unit 64.

Values of the XBNK and XBAS are input to the base address calculating unit 62 from a register of the DXMAU 60, and also a value of a variable K is input to the base address calculating unit 62 from the bank counter 61. The base address calculating unit 62 calculates a base address (XBAS+XBNK×K) based on the input XBNK, XBAS and K. The initial value of the base address is equal to XBAS as K=0. The calculated base address is provided to the program counter comparing unit 63 and the address generating unit 64. The base address (XBAS+XBNK×K) represents an address of a boundary between the banks of the RAM 40 in which the DSP program (block programs) is stored.

Values of XBNK and XBAS are input to the program counter comparing unit 63 from the DXMAU 60. A count value PC of the program counter 51 is also input to the program counter comparing unit 63. Additionally, a value of the base address (XBAS+XBNK×K) is input to the program counter comparing unit 63 from the base address calculating unit 62.

First, the program counter comparing unit 63 compares the count value PC with XBAS which is the initial value of the base address (XBAS+XBNK×K). If the value PC is greater than XBAS (PC>XBAS), the program counter comparing unit 63 determines that execution of the block program in the RAM 40 is started, and starts a comparison calculation between the count value PC and a sum of (XBAS+XBNK×K) and XBNK (K=0, 1, 2, . . . ).

As a result of the comparison calculation, if it is determined that the count value PC is greater than the sum of (XBAS+XBNK×K) and XBNK, the program counter comparing unit 63 determines that the DSP core 50 starts execution of the block program stored in the subsequent bank, and provides an increment enable signal incen to the address generating unit 64.

The program counter comparing unit 63 outputs the increment enable signal incen for a length of XBNK, and, thereafter, outputs an increment signal inc so as to increment a value K of the bank counter 61.

The address generating unit 64 generates an offset address [0, XBNK−1] with respect to the base address (XBAS+XBNK×K) based on the increment enable signal incen so as to generate an address owp by adding the offset address to the base address. Additionally, the address generating unit 64 generates a load signal LD and a read signal RD based on the above-mentioned increment enable signal incen. The load signal LD is for loading a block program to the RAM 40. The read signal RD is for reading a block program in the external RAM 80.

If the address owp is greater than XLIM, the address generating unit 64 determines that block programs in all banks of the memory area of the RAM 40 have been rewritten. Accordingly, the address generating unit 64 sends a reset signal rst to the bank counter 61 and the program counter comparing unit 63 so as to reset the value of the integer variable K to zero. The sequentially loaded block program is stored in the first bank since the integer variable K is reset to zero.

Figure 20:
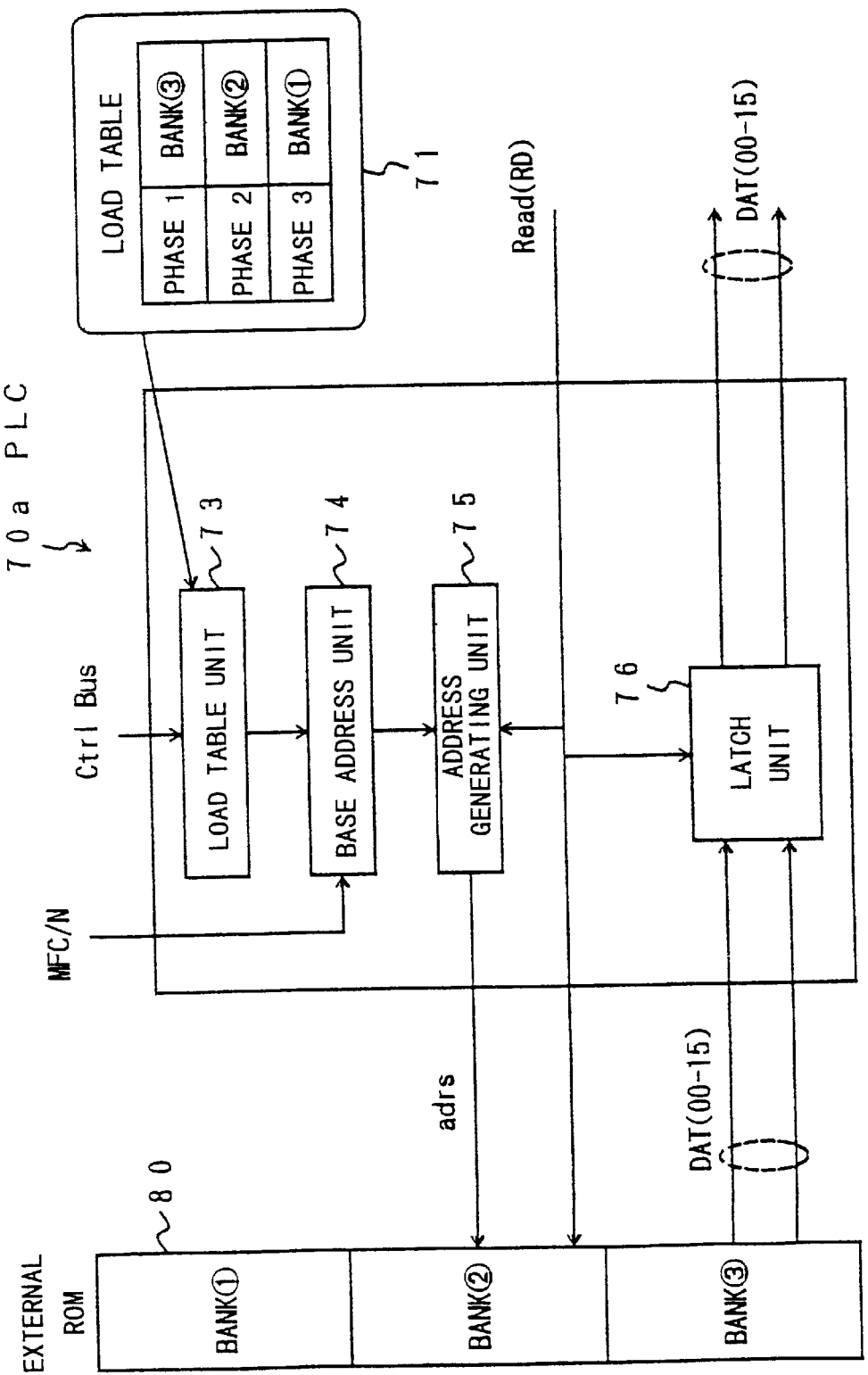
FIG. 20 is a block diagram of a first example of a PLC shown in FIG. 16.

FIG. 20 is a block diagram of a PLC 70a which is a first example of the PLC 70.

As shown in FIG. 20, the PLC 70a comprises a load table unit 73, a base address unit 74, an address generating unit 75 and a latch unit 76.

The load table unit 73 stores the load table information 71. The contents of the load table information 71 is read when a signal is input through a control bus Ctrl Bus which controls an operation of the PLC 70a. The read contents of the load table information 71 is sent to the base address unit 74.

The base address unit 74 generates a base address which is required for determining an access address adrs based on the contents of the load table information 71 when the base address unit 74 reads the block programs from the external ROM 80. The access address is used for specifying a block program in which the block program is stored. When a unit process of the operation of the DSP 10A is performed by N phases, the generation of the base address is performed in synchronization with a timing of a clock which is generated by dividing the master frame clock MFC which synchronizes with a time required for the unit process.

The address generating unit 75 generates the offset address with respect to the base address by incrementing based on the read signal RD from the DXMAU 60. Thereafter, the offset address is added to the base address adrs so as to generate the access address for the external ROM 80. The block program read from the memory area of the ROM 80 indicated by the access address is provided to the DXMAU 60 via the latch unit 76.

Figure 21:
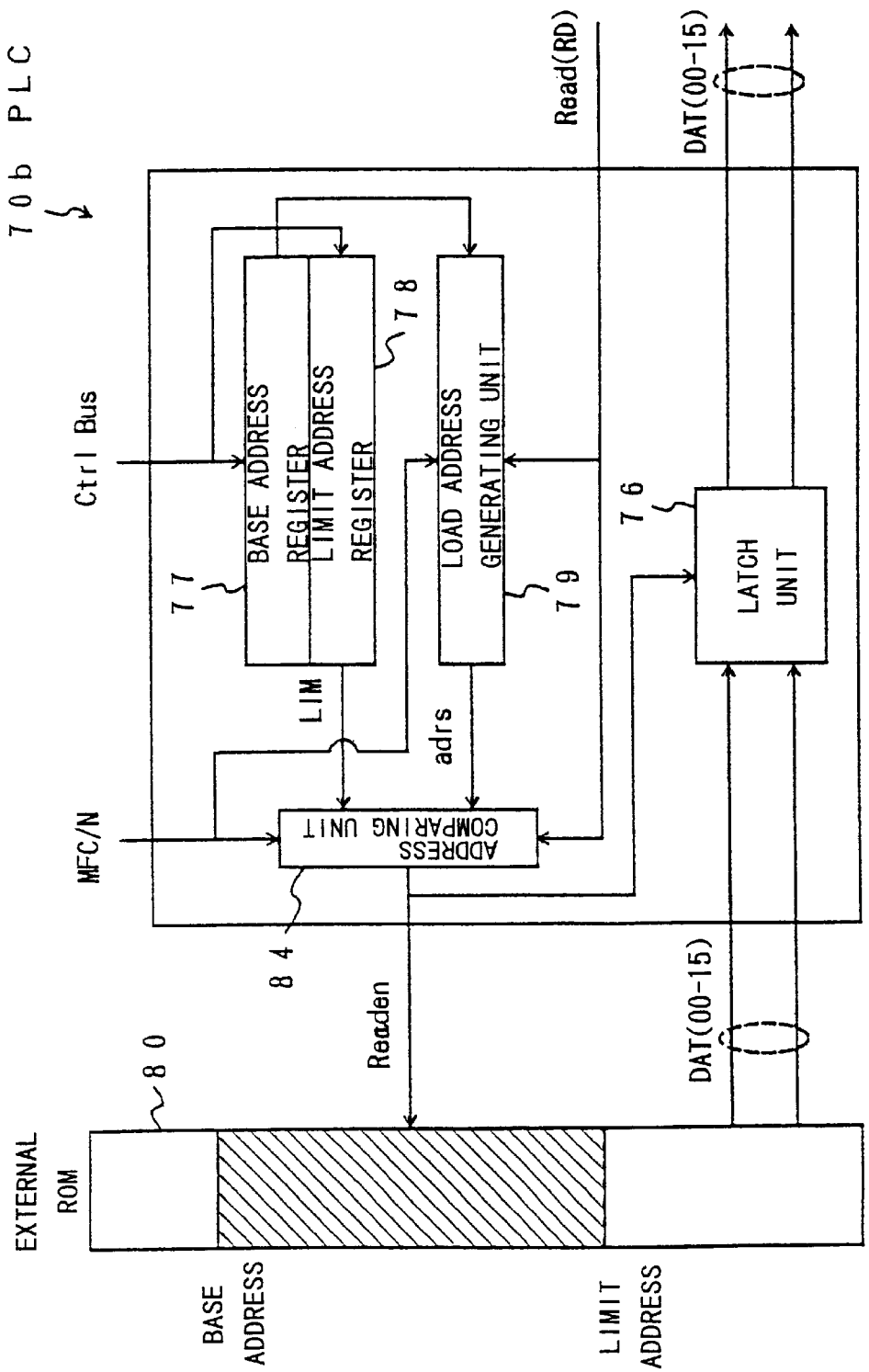
FIG. 21 is a block diagram of a second example of the PLC shown in FIG. 16.

FIG. 21 is a block diagram of a PLC 70b which is a second example of the PLC 70.

As shown in FIG. 21, the PLC 70b comprises a latch unit 76, a base address register 77, a limit address register 78, a load address generating unit 79 and the address comparing unit 84.

A base address and a limit address are set in the base address register 77 and the limit address register, respectively, through the control. bus Ctrl Bus which controls an operation of the PLC 70b. The base address and the limit address are used for designating a specific area in the memory area of the ROM 80 from which programs are read.

The load address generating unit 79 read the base address from the base address register according to a timing of the signal MFC/N. Then, upon receipt of the read signal RD from the DXMAU 60, the load address generating unit 79 sequentially increments the base address so as to generate the load address adrs and outputs the generated load address adrs to the address comparing unit 84.

The address comparing unit 84 compares the load address adrs obtained form the load address generating unit 79 with the limit address LIM obtained form the limit address register 78. As a result, if adrs is equal to or smaller than LIM, the address comparing unit 84 sends a designating signal Readen to the ROM 80 at a timing of the read signal RD being input to the PLC 70b. The designating signal Readen is used for reading the block program from the ROM 80. Accordingly, the block program stored in a memory area designated by the load address adrs is read and provided to the DXMAU 60 via the latch unit 76.

On the other hand, if adrs is greater than LIM (adrs>LIM), the address comparing unit 84 recognizes that the memory area of the ROM 80 designated by the load address adrs is out of the memory area from which the block program is to be read. Thus, the signal Readen is not generated.

Figure 22:
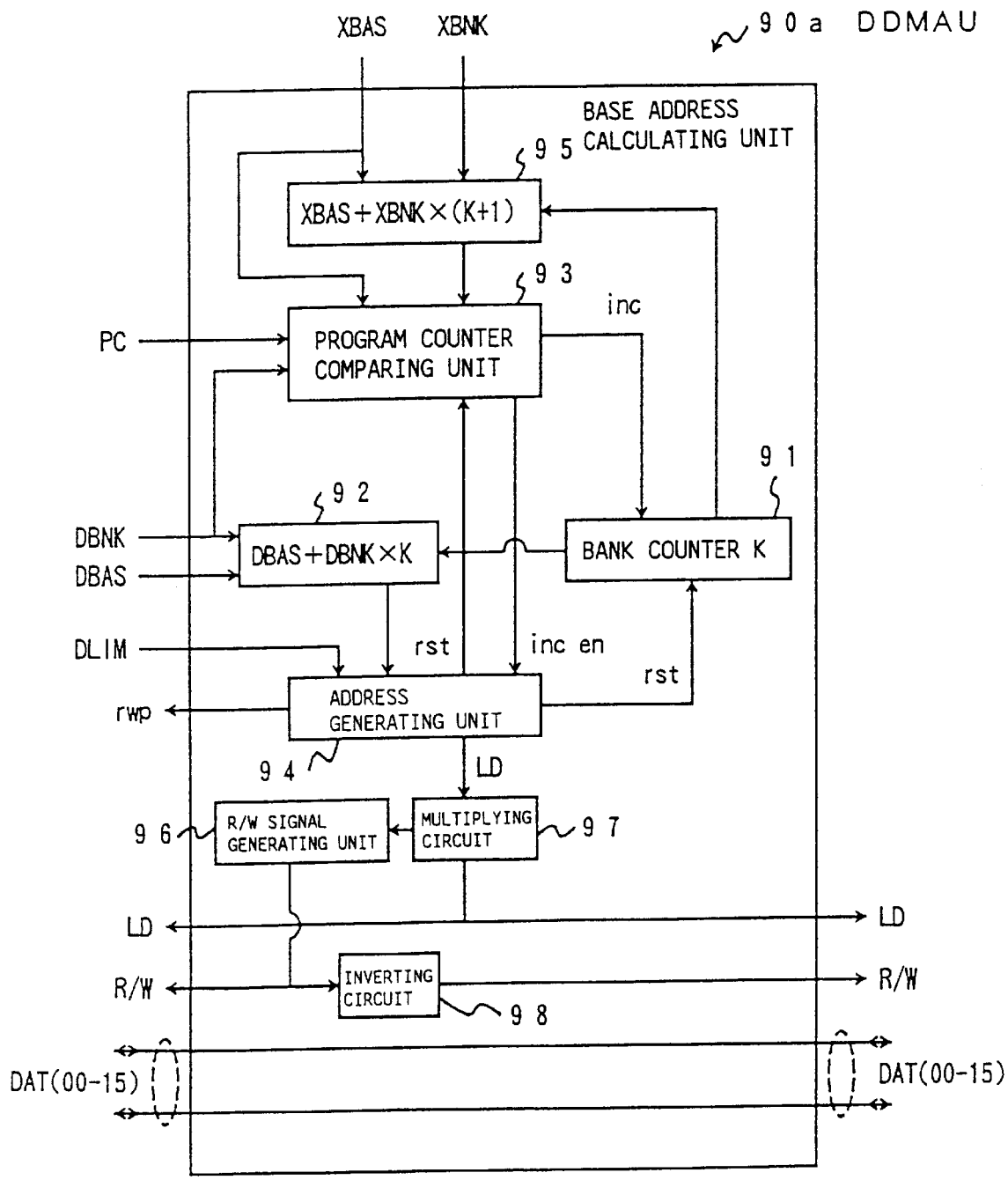
FIG. 22 is a block diagram of a first example of a DDMAU shown in FIG. 10.

FIG. 22 is a block diagram of a DDMAU 90a which is a first example of the DDMAU 90.

As shown in FIG. 22, the DDMAU 90a comprises a bank counter 91, a base address calculating unit 92 for a data memory, a program counter comparing unit 93, an address generating unit 94, a base address calculating unit 95 for a program memory, a R/W signal generating unit 96, a multiplying circuit 97 and an inverting circuit 98. The DDMAU 90a is a program counter monitoring type.

The base address calculating unit 95 calculates a base address (XBAS+XBNK×(K+1)) based on the XBNK, XBAS and K. The calculated base address is provided to the program counter comparing unit 93. The base address calculating unit 92 calculates a base address (XBAS+XBNK×K) based on the XBNK, XBAS and K, and provides the calculated base address to the address generating unit 94.

The program counter comparing unit 93 compares the count value PC with the base address (XBAS+XBNK×(K+1)). If the value PC is greater than (XBAS+XBNK×(K+1)), the program counter comparing unit 93 outputs the increment enable signal incen for a length of XBNK similar to the DXMAU 60 so a to cause the address generating unit 94 to rewrite data on a DBNK unit basis.

Thereafter, the program counter comparing unit 93 outputs the increment signal inc so as to increment the value K of the bank counter 91.

The address generating unit 94 generates an offset address with respect to the base address (DBAS+DBNK×K) based on the increment enable signal incen so as to generate an access pointer for the RAM 80 by adding the offset address to the base address.

Additionally, the address generating unit 94 generates a load signal LD for the RAM 30 which is a data memory, and provides the load signal LD to the multiplying circuit 97. If the access pointer rwp is greater than DLIM, the address generating unit 94 determines that a rewriting operation for all banks in the memory area of the RAM 30 is completed. Thus, the address generating unit 94 sends a reset signal rst to the program counter comparing unit 93 so as to reset the value of the integer variable K.

The DDMAU 90 serves to load work data to the data memory on an individual data block basis. Additionally, the DDMAU 90 unit serves to store work data to the ERAM 110 via the PDLC 100. Accordingly, the DDMAU 90 divide a period of the load signal LD into two periods which load signal LD determines a timing for rewriting the work data so as to set a phase to store the work data and a phase to load the work data. The multiplying circuit 97 and the read/write (R/W) signal generating unit 96 serve to set the phase to store the work data and the phase to load the work data.

The read/write signal R/W for the RAM 30 provided within the DSP 10 and the read/write signal R/W for the ERAM 110 provided outside the DSP 10 must be logically inverted to each other. Thus, an inverting circuit 98 is provided in the DDMAU 90a.

Figure 23:
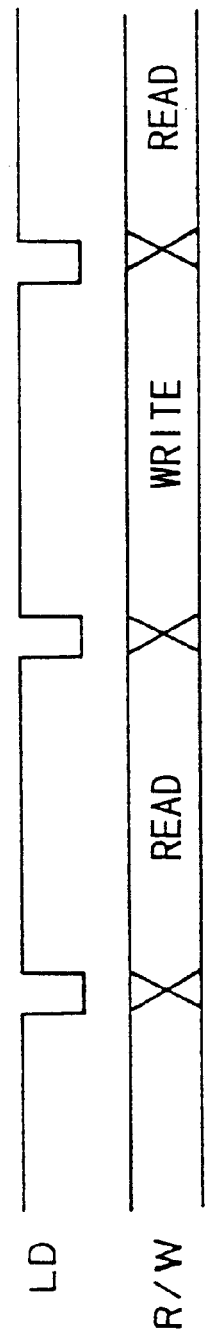
FIG. 23 is a timing chart for showing a relationship between a load signal and a read/write signal R/W generated by the DDMAU shown in FIG. 22.

FIG. 23 is a timing chart for showing a relationship between the load signal LD and the read/write signal R/W generated by the DDMAU 90a. As shown in FIG. 23, when the load signal LD is being generated, the read signal or the write signal is being generated.

Figure 24:
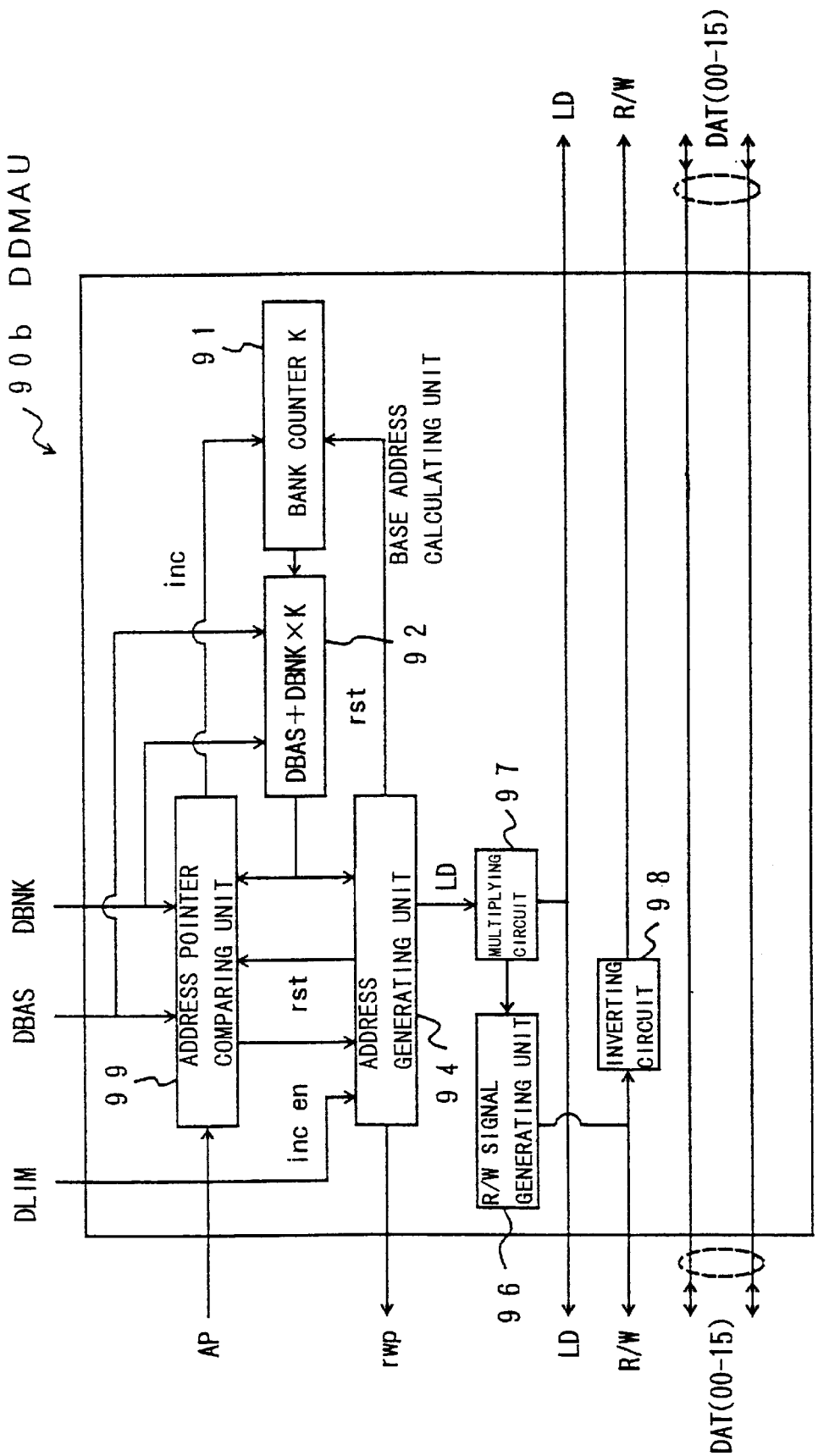
FIG. 24 is a block diagram of a second example of the DDMAU shown in FIG. 10.

FIG. 24 is a block diagram of a DDMAU 90b which is a second example of the DDMAU 90.

As shown in FIG. 24, the DDMAU 90b is an access pointer monitoring type. The DDMAU 90b has the same structure as the DDMAU 90a except for an address pointer comparing unit 99 being provided instead of the program counter comparing unit 93 of the DDMAU 90a. The address pointer comparing unit 99 compares the access pointer AP with the base address (DBAS+DXBNK×K). Other parts of the DDMAU 90b are the same as the parts of the DDMAU 90a, and descriptions thereof will be omitted.

Figure 25:
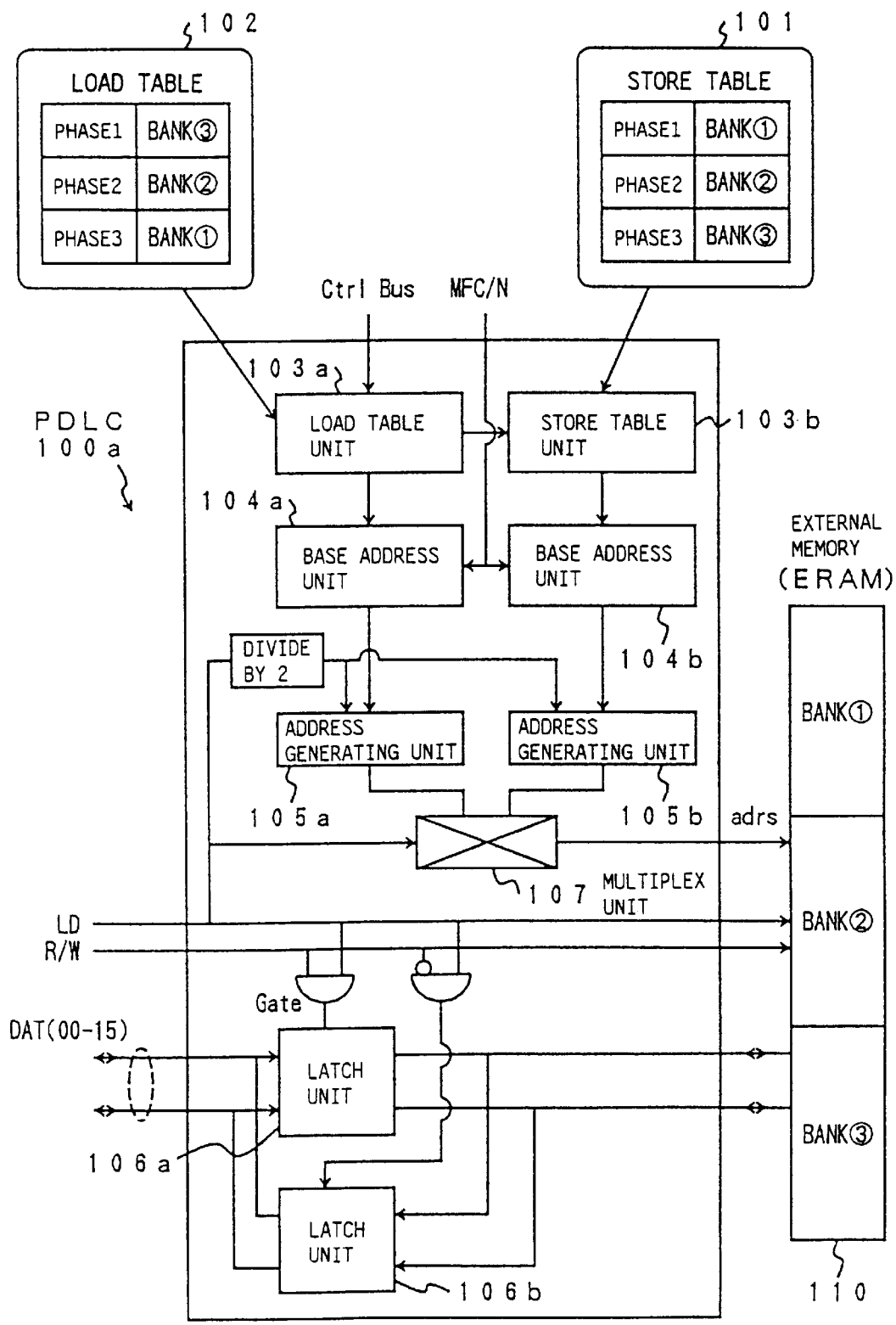
FIG. 25 is a block diagram of a first embodiment of a PDLC shown in FIG. 10.

FIG. 25 is a block diagram of a PDLC 100a which is a first example of the PDLC 100.

As shown in FIG. 25, the PDLC 100a comprises a load table unit 103a, a store table unit 103b, base address units 104a and 104b, address generating units 105a and 105b, latch units 106a and 106b and a multiplex unit 107.

The load table unit 103a stores load table information 102. The contents of the load table information 102 is read by a signal transmitted through control bus Ctrl Bus.

The store table unit 103b stores store table information 101. The store table information 101 is produced based on the load table information 102 received from the load table unit 103. The store table information 101 is produced by shifting the contents of the load table information by single phase.

The contents of the load table information 102 is sent to the base address unit 104a. The base address unit 104a produces a base address for loading work data based on the contents of the load table information 102. The base address is used for designating the memory area of the ERAM 110 which is an external memory from which the work data is read. The base address for loading the work data is produced in synchronization with a timing of the signal MFC/N which is generated by dividing the master frame clock signal MFC by N.

The base address unit 104b produces a base address for storing the work data based on the contents of the store table information provided from the store table unit 103b. The base address for storing the work data is used for designating the memory area of the ERAM 110 when storing the work data in the ERAM 110. The base address for storing the work data is produced also in synchronization with the timing of the signal MFC/N.

The base addresses produced by the base address units 104a and 104b are input to the address generating units 105a and 105b, respectively.

As previously mentioned, a period of the load signal LD provided from the DDMAU 90 to the PDLC 100a is divided into two periods one of which corresponds to the a phase to store the work data and the other corresponds to a phase to load the work data. The divided load signals are increment signals of the address generating units 105a and 105b.

Each of the address generating units 105a and 105b adds the respective offset address to the base address so as to generate the load address and the store address, respectively. The load address and the store address are input to the multiplex unit 107. The multiplex unit 107 time-divisional-multiplexes the load address and the store address so as to generate an address with respect to the ERAM 110 so that the work data is loaded from or stored in the memory area of the ERAM 110 which is designated by the address.

The work data input from the ERAM 110 to the PDLC 100a and transferred through a data bus is latched by a gate signal produced from the read/write signal R/W, and the latched work data is provided to the DDMAU 90.

Figure 26:
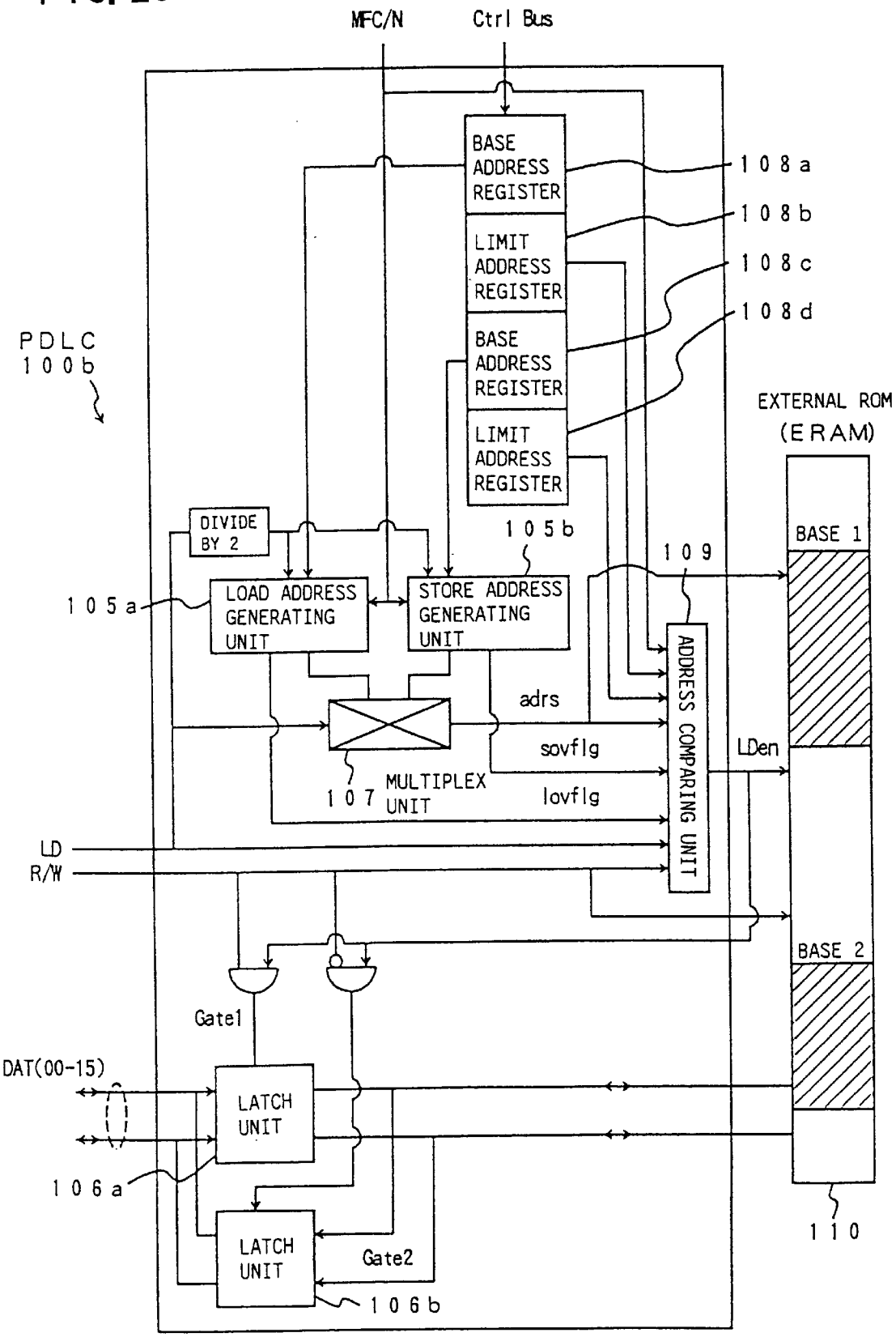
FIG. 26 is a block diagram of a second example of the PDLC shown in FIG. 10.

FIG. 26 is a block diagram of a PDLC 100b which is a second example of the PDLC 100.

As shown in FIG. 26, the PDLC 100b comprises address generating units 105a and 105b, latch units 106a and 106b, a multiplex unit 107, base address registers 108a and 108c, limit address registers 108b and 108d and an address comparing unit 109. The address generating units 105a and 105b, the latch units 106a and 106b and the multiplex unit 107 are the same as that of the PDLC 100a, and descriptions thereof will be omitted.

The base address for loading data, the limit address for loading data, the base address for storing data and the limit address for storing data are provided to the through the control bus Ctrl Bus. These addresses are stored in the base address register 108a, the limit address register 108b, the base address register 108c and the limit address register 108d.

The base address for loading data and the limit address for loading data indicate a start address and an end address of the work data in the ERAM 110 which work data is transferred to the DDMAU 90. The base address for storing data and the limit address for storing data indicate a start address and an end address of the work data in the ERAM 110 which work data is transferred from the DDMAU 90.

The load address generating unit 105a reads a value stored in the base address register 108a based on the signal MFC/N. Then, the load address generating unit 105a sequentially increments the read value at a timing of the divided load signal LD indicating a timing of loading or storing the work data. The incremented value is output as the load address. The load address generating unit 105a raises a flag lovflg when the load address exceeds the end address of the work data in the ERAM 110.

Similar to the load address generating unit 105a, the store address generating unit 105b reads a value stored in the base address register 108c based on the signal MFC/N. Then, the store address generating unit 105b sequentially increments the read value at a timing of the divided load signal LD indicating a timing of loading or storing the work data. The incremented value is output as the store address. The store address generating unit 105b raises a flag sovflg when the store address exceeds the end address of the work data in the ERAM 110. The load address and the store address are alternately output from the multiplex unit 107 according to the load signal LD as a reference clock.

The address comparing unit 109 reads the limit address for loading data from the limit address register 108b at the timing of the signal MFC/N. The address comparing unit 109 also reads the limit address for storing data from the limit address register 108d at the timing of the signal MFC/N. Then, the address comparing unit 109 determines whether the address adrs provided from the multiplex unit 107 is the load address or the store address based on the read/write signal R/W.

If the address adrs provided from the multiplex unit 107 to the address comparing unit 109 is the load address, the address adrs is compared with the limit address LIM1 for loading data. If the address adrs is equal to or smaller than the limit address LIM1, the address comparing unit 109 outputs a load enable signal LDen at a timing of the load signal LD. If the address adrs is greater than the limit address LIM1 or if the flag lovflg is raised, the address comparing unit 109 does not output the load enable signal LDen.

If the address adrs provided from the multiplex unit 107 to the address comparing unit 109 is the store address, the address adrs is compared with the limit address LIM2 for storing data. If the address adrs is equal to or smaller than the limit address LIM2, the address comparing unit 109 outputs a load enable signal LDen at a timing of the load signal LD. If the address adrs is greater than the limit address LIM2 or if the flag sovflg is raised, the address comparing unit 109 does not output the load enable signal LDen.

When the read/write signal R/W indicates loading of the work data, the work data in a memory area of the ERAM 110 designated by the address adrs output from the multiplex unit 107 is provided to the DDMAU 90 via the latch unit 106B by using a signal LD&NOT(R/W) as a clock.

Additionally, when the read/write signal indicates storing of the work data, the work data transferred from the DDMAU 90 is stored in the memory area of the ERAM 110 designated by the address adrs output form the multiplex unit 107 via the latch unit 106a by using a signal LD&R/W as a clock.

Since the PDLC 100b is constructed as mentioned above, the memory area of the ERAM 110 in which the work data is stored or from which the work data is loaded is not fixed, and the start address and the end address of the memory area of the work data are determined for each phase. Accordingly, if a size of data required by the CODEC2 varies from phase to phase, the memory capacity of the ERAM 110 can be minimized by designating the memory area is necessary.

The present invention is not limited to the specifically disclosed embodiments, and variations and modifications may be made without departing from the scope of the present invention.

The present application is based on Japanese priority application No.10-115505 filed on Apr. 24, 1998, the entire contents of which are hereby incorporated by reference.

What is claimed is:

1. A CODEC comprising a data processing unit performing an encoding/decoding operation on a digital signal, said data processing unit comprising:

a program memory storing a program divided into a plurality of block programs, the program being stored on an individual block program basis;

a data memory for storing a set of data used for executing each block program stored in said program memory, the set of data being divided into a plurality of data blocks and stored on an individual data block basis;

a program executing unit for executing each block program stored in said program memory by using a corresponding data block stored in said data memory; and a program changing unit for obtaining a new block program from an external device each time execution of one of said block programs by said program executing unit is completed so as to store the obtained new block program in said program memory.

2. The CODEC as claimed in claim 1, wherein said program memory includes a plurality of banks each of which stores one of the block programs so that the program is executed by the program executing unit sequentially executing the block program in each of the banks selected in a predetermined order.

3. The CODEC as claimed in claim 1, wherein said data memory includes a plurality of banks each of which stores one of the data blocks so that the data block stored in one of the banks is used when each of the program blocks is executed by said program executing unit, the one of the banks being sequentially selected in a predetermined order.

4. The CODEC as claimed in claim 1, wherein said program changing unit stores the new block-program in one of the banks of said program memory, said one of the banks having stored one of the block programs of which execution is completed.

5. The CODEC as claimed in claim 1, wherein said data processing unit further comprises a block-program obtaining unit for obtaining the new block program from a first external memory each time an execution of said block program by said program executing unit is completed so as to provide the obtained block program to said program changing unit.

6. The CODEC as claimed in claim 5, wherein said block program obtaining unit has first load table information representing a relationship between phases of a program processing and the block program obtained from said first external memory, said block program obtaining unit for obtaining the new block program from said first external memory based on said first load table information.

7. The CODEC as claimed in claim 1, wherein said data processing unit further comprises a data changing unit obtaining a new data block from an external device each time execution of one of said block programs by said program executing unit is completed so as to store the obtained new data block in said data memory.

8. The CODEC as claimed in claim 7, wherein said data processing unit further comprises a data-block obtaining unit obtaining the new data block program from a second external memory each time an execution of said block program by said program executing unit is completed so as to provide the obtained new data block to said data changing unit.

9. The CODEC as claimed in claim 8, wherein said data-block obtaining unit has store table information and second load table information, said store table information representing a relationship between phases of a program processing and data to be returned from said data memory to said second external memory, said second load table information representing a relationship between the phases of a program processing and data to be obtained from said second external memory, said data block obtaining unit returning the data block that have been used from said data memory to said second external memory, said data block obtaining unit obtaining the new data block from said second external memory based on said second load table information.

10. The CODEC as claimed in claim 9, wherein said second load table information and said store table information are rewritable.

11. The CODEC as claimed in claim 6, wherein said first load table information is rewritable.

* * * * *